*(12)* United States Patent
Malik

*(10)* Patent No.: US 9,503,281 B2
*(45)* Date of Patent: Nov. 22, 2016

(54) MERGING INSTANT MESSAGING (IM) CHAT SESSIONS

(71) Applicant: AT&T Intellectual Property I, L.P., Atlanta, GA (US)

(72) Inventor: Dale W. Malik, Dunwoody, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/816,495

(22) Filed: Aug. 3, 2015

(65) Prior Publication Data

US 2015/0341289 A1    Nov. 26, 2015

Related U.S. Application Data

(63) Continuation of application No. 13/556,453, filed on Jul. 24, 2012, now Pat. No. 9,100,220, which is a continuation of application No. 12/902,097, filed on Oct. 11, 2010, now Pat. No. 8,244,807, which is a continuation of application No. 10/685,562, filed on Oct. 14, 2003, now Pat. No. 7,844,662.

(51) Int. Cl.
*G06F 15/16* (2006.01)
*H04L 12/58* (2006.01)
*G06Q 10/10* (2012.01)

(52) U.S. Cl.
CPC ............ *H04L 12/581* (2013.01); *G06Q 10/107* (2013.01); *H04L 51/04* (2013.01); *H04L 51/16* (2013.01); *H04L 12/5835* (2013.01); *H04L 12/5885* (2013.01); *H04L 51/066* (2013.01)

(58) Field of Classification Search
None
See application file for complete search history.

(56) References Cited

U.S. PATENT DOCUMENTS

| 6,167,433 A | 12/2000 | Maples et al. |
| 6,212,548 B1 | 4/2001 | DeSimone et al. |
| 6,434,599 B1 | 8/2002 | Porter |
| 6,496,851 B1 | 12/2002 | Morris et al. |
| 6,651,086 B1 | 11/2003 | Manber et al. |
| 6,917,962 B1 | 7/2005 | Cannata et al. |
| 6,941,345 B1 | 9/2005 | Kapil et al. |
| 6,981,021 B2 | 12/2005 | Takakura et al. |
| 7,130,884 B2 | 10/2006 | Maehiro |
| 2001/0051982 A1 | 12/2001 | Graziani |
| 2003/0064807 A1 | 4/2003 | Walker et al. |

OTHER PUBLICATIONS

Day et al.; Title: A Model for Presence and Instant Messaging; Feb. 2000; pp. 1-17.
W3C; Title: Extensible Markup Language (XML( 1.0 (Second Edition), W3C Recommendation; Oct. 6, 2000; pp. 1-59.
Day et al., Instant Messaging / Presence Protocol Requirements; Feb. 2000; pp. 1-26.
Website: http://www.ceruleanstudios.com/trillian/features-1.html; Cerulean Studios Trillian; printed Apr. 23, 2003; pps. include: Features Tour, Messaging Enhancements, Interface Overview, Connect to 5 Mediums, and 3 individual Feature tours.
Website: http://www.jabber.org, Jabber Software Foundation; printed Apr. 23, 2003; pp. 1-3.
Saint-Andre et al., Title: XMPP Instant Messaging; Jun. 4, 2003; pp. 1-87.

*Primary Examiner* — Thomas Dailey
(74) *Attorney, Agent, or Firm* — Akerman LLP; Michael K. Dixon; Mammen (Roy) P. Zachariah, Jr.

(57) ABSTRACT

The present disclosure provides for merging of instant messaging (IM) chat sessions. In one embodiment, a method for automatically replying to an IM message from a first IM sender when a recipient is engaged in an IM session with a second IM sender is provided. In another embodiment, the disclosure provides a method for forwarding IM messages to a recipient at different IM clients. In still another embodiment, a method for transferring IM messages to a different recipient is provided. In some embodiments, two separate IM chat sessions are merged into a single IM chat session.

20 Claims, 14 Drawing Sheets

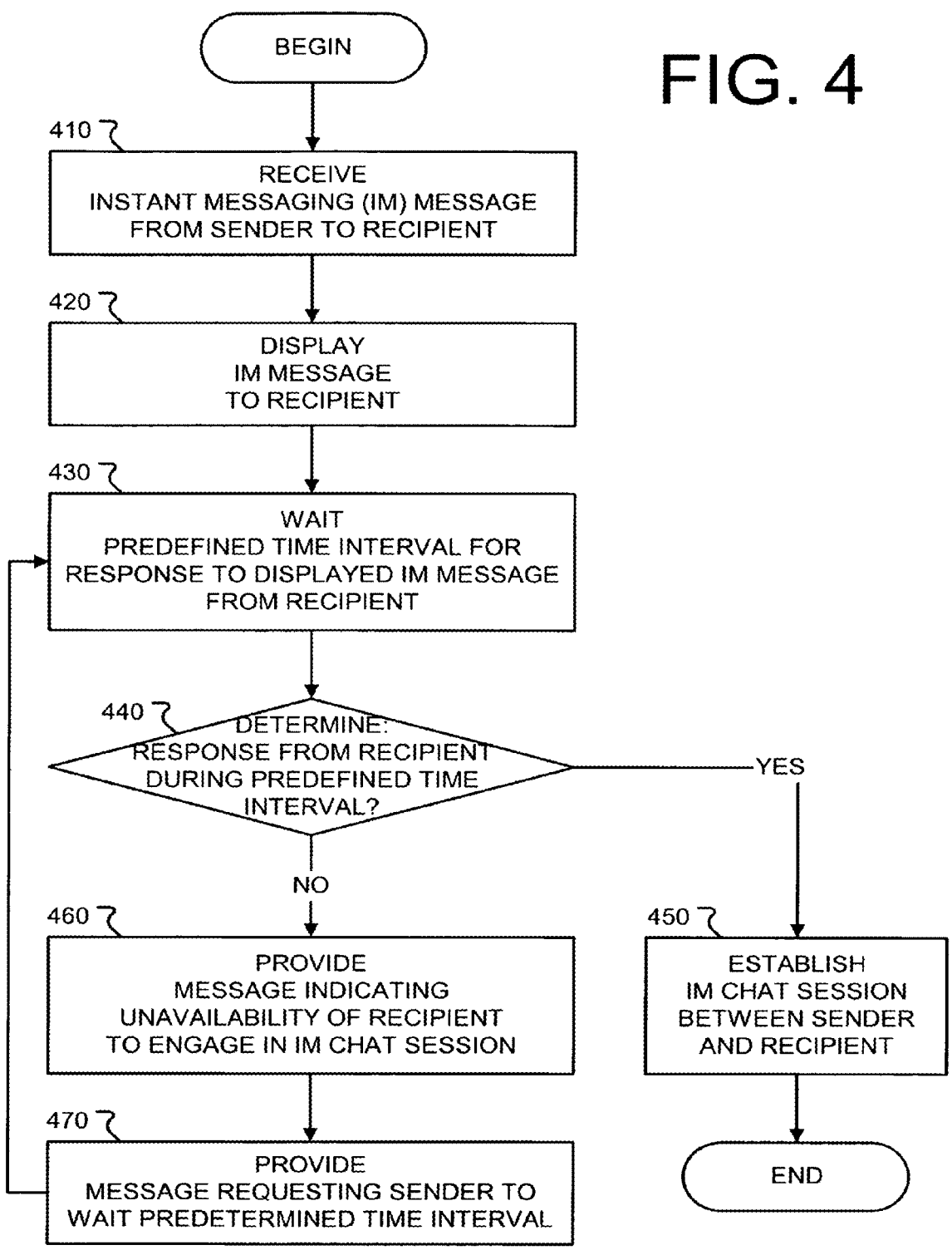

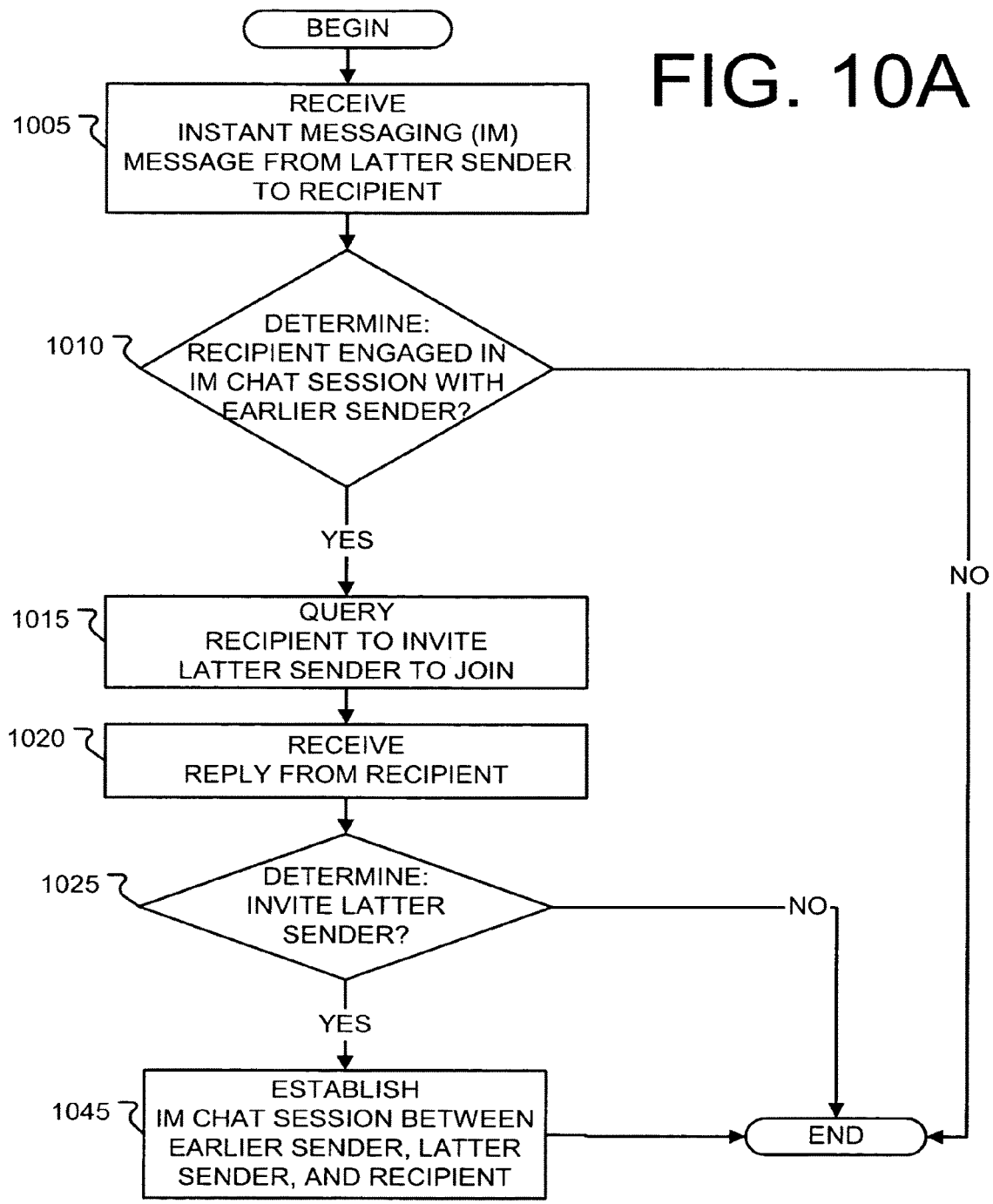

MERGING INSTANT MESSAGING (IM) CHAT SESSIONS

CROSS REFERENCE TO RELATED APPLICATIONS

This application is a continuation of U.S. patent application Ser. No. 13/556,453 filed Jul. 24, 2012, which is a continuation of U.S. patent application Ser. No. 12/902,097 filed Oct. 11, 2010, now U.S. Pat. No. 8,244,807, which is a continuation of U.S. patent application Ser. No. 10/685,562 filed Oct. 14, 2003, now U.S. Pat. No. 7,844,662, which claims the benefit of U.S. patent application Ser. No. 10/274,405, filed Oct. 18, 2002; U.S. patent application Ser. No. 10/274,408, filed Oct. 18, 2002; U.S. patent application Ser. No. 10/274,478, filed Oct. 18, 2002; U.S. patent application Ser. No. 10/325,290, filed Dec. 19, 2002; U.S. patent application Ser. No. 10/364,693, filed Feb. 10, 2003; U.S. patent application Ser. No. 10/364,703, filed Feb. 10, 2003; U.S. Provisional Patent Application Ser. No. 60/411,336, filed Sep. 17, 2002; U.S. Provisional Patent Application Ser. No. 60/411,438, filed Sep. 17, 2002; U.S. Provisional Patent Application Ser. No. 60/416,916, filed Oct. 8, 2002; U.S. Provisional Patent Application Ser. No. 60/419,613 filed on Oct. 17, 2002; U.S. Provisional Patent Application Ser. No. 60/426,145, filed Nov. 14, 2002; U.S. Provisional Patent Application Ser. No. 60/426,146, filed Nov. 14, 2002; U.S. Provisional Patent Application Ser. No. 60/426,422, filed Nov. 14, 2002; U.S. Provisional Patent Application Ser. No. 60/426,432, filed Nov. 14, 2002; and U.S. Provisional Patent Application Ser. No. 60/426,440, filed Nov. 14, 2002, all of which are incorporated by reference in their entireties.

FIELD OF THE INVENTION

The present disclosure relates generally to digital communications and, more particularly, to instant messaging (IM).

BACKGROUND

The explosive growth of digital communications media has supplemented conventional forms of communication. One example of digital communications is instant messaging (IM). As known to those having skill in the art, the IM environment is defined in RFC 2778 and RFC 2779, which was published by the Internet Engineering Task Force (IETF) in February of 2000. Briefly, the IM environment provides a medium in which digital communications occurs on a near real-time basis between a sender and a recipient, thereby permitting a sender to send and receive "instant" messages to and from a recipient.

While the near real-time communication of IM is appealing, IM nonetheless has several drawbacks. For example, unlike face-to-face conversations, when the recipient steps away from the recipient's workstation for a moment, the sender may send messages to the recipient without any knowledge that the recipient is no longer at the workstation. In order to remedy this deficiency, others have manipulated presence mechanisms of IM to display presence-status indications (also referred to simply as "status indications") that are indicative of the recipient's absence. For example, these status indications may include messages that indicate that the recipient is "away," "busy," "unavailable," etc.

As is known in the art, the status indications may be manually set by the recipient prior to the recipient's absence from the workstation. Alternatively, the status indications may be programmed to activate after a predefined time interval when there is no activity at the recipient's workstation and programmed to deactivate when the recipient begins typing again. Unfortunately, the status indications provide only a limited remedy to the aforementioned drawbacks. For this reason, a need exists in the industry for improved IM systems that provide supplemental remedies to the aforementioned drawbacks.

SUMMARY

Preferred embodiments of the present disclosure provide for merging of instant messaging (IM) chat sessions into a single chat room. In some embodiments, an IM message from a second sender to the recipient is received while a first IM chat session has already been established between a first sender and the recipient. In response to receiving the IM message from the second sender, an IM chat room is established between the recipient, the first sender, and the second sender.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a flowchart showing an embodiment of a method for automatically replying to IM messages when an IM recipient does not respond for a predefined time interval.

FIG. 10A is a flowchart showing another embodiment of a method for merging IM chat sessions.

DETAILED DESCRIPTION OF THE PREFERRED EMBODIMENTS

Figure 1:
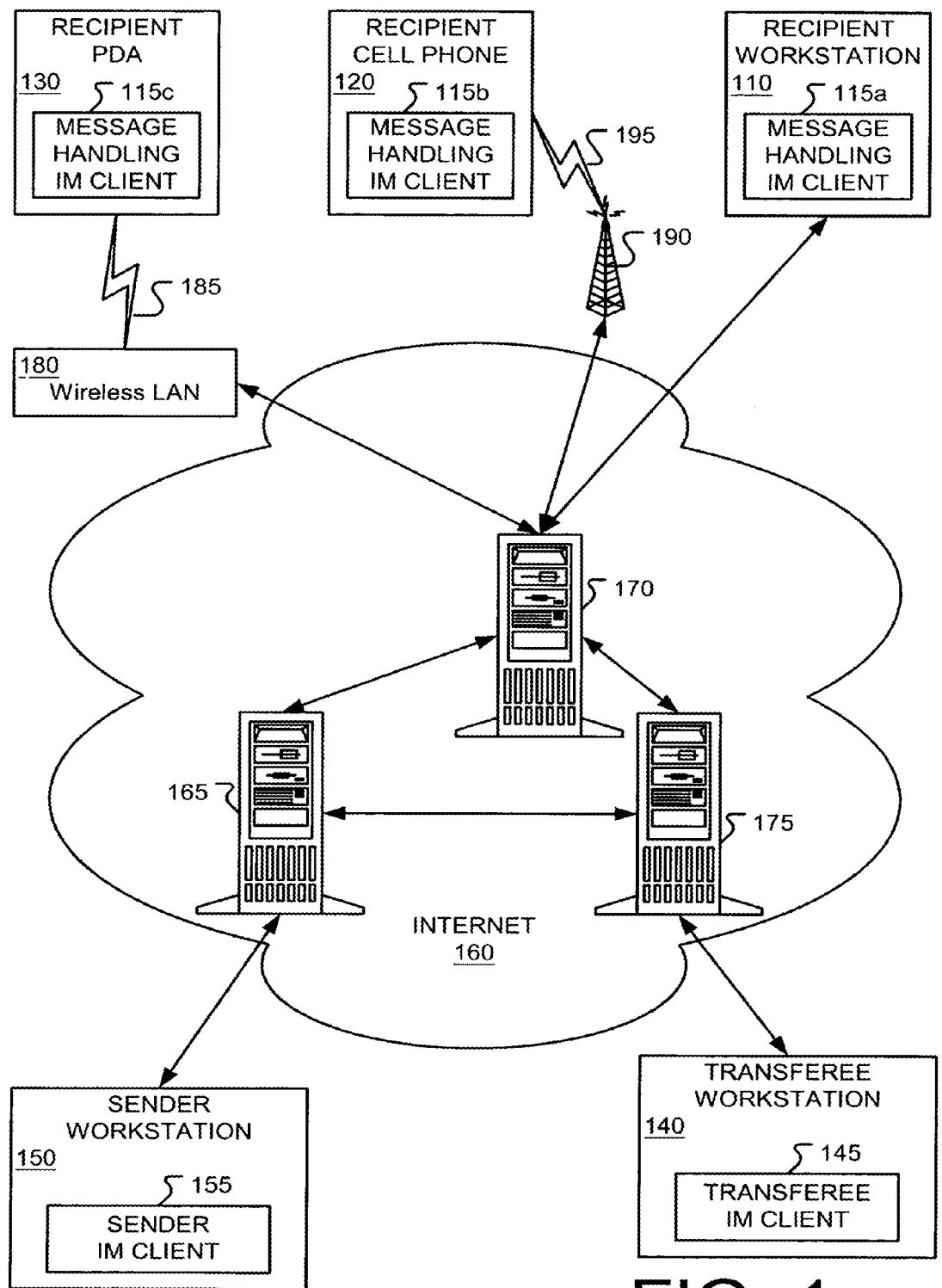
FIG. 1 is a block diagram showing an embodiment of a system having a message-handling instant messaging (IM) client.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

While instant messaging (IM) systems have become increasingly sophisticated, several of the options available to telephone users are still unavailable to IM users. In some instances, those options available for the telephone are unnecessary in IM environments due to the very nature of the IM environment. For example, while a telephone often permits communications only between a caller and a callee, an IM recipient may receive multiple IM messages from multiple senders when the IM recipient is logged on at an IM client.

Unfortunately, unlike telephones, which connect a caller to a callee only when a callee is physically able to pick up the telephone, IM permits a sender to transmit an IM message to a recipient so long as the recipient has an accessible Internet presence (e.g., present and available) on IM, regardless of whether or not the recipient may be physically present at the workstation. Thus, when an IM recipient has stepped away from the workstation, any incoming IM message may be displayed without a reply from the recipient. In those instances, the IM sender often cannot discern whether the recipient has stepped away for a brief instance, or whether the recipient has chosen to ignore the incoming IM message, or whether the sender is on a "blacklist" (e.g., ignore list, etc.).

It should be appreciated that the displaying of the message entails the execution of a command from the processor to display the message. In this regard, even when the recipient cannot physically view the message, it should be understood that the message is "displayed" when the processor issues the command to display the message.

The term "presence" is used herein to indicate Internet presence, rather than physical presence, unless otherwise indicated. Hence, in order to avoid ambiguity, the term "physical presence" is explicitly used throughout this disclosure to denote physical presence, and the term "presence" is used to denote Internet presence (or online presence) as defined in RFC 2778, RFC 2779, or other Internet-related documents.

In some embodiments, approaches are presented in which a message-handling IM client may automatically respond to incoming IM messages on behalf of a recipient. Unlike prior systems that globally provide a presence-status indication (also referred to herein as "status indication" or, simply, "status," e.g., available, away, busy, unavailable, etc.), the embodiments herein provide for a message-by-message auto-reply. Hence, while prior systems provide timers that track a user's activity at IM clients, the embodiments herein provide timing mechanisms that track elapsed times as a function of received IM messages. Thus, in some embodiments, the timing mechanism tracks elapsed times from receipt of an IM message. In other embodiments, the timing mechanism tracks elapsed times from a time of displaying an IM message. In these several embodiments, the elapsed time is calculated as a function of the specific IM message. Hence, rather than setting a global status that is visible to all potential senders, the message-handling IM client responds to each IM message on a message-by-message basis.

In other embodiments, approaches are presented in which a message-handling IM client may automatically forward incoming IM messages to other IM addresses at which the recipient is present. For example, a recipient may concurrently be logged in using several different IM addresses (e.g., concurrently logged in at a workstation using a first IM address (or account), a cellular telephone using a second IM address, and a personal digital assistant (PDA) using a third IM address). In those instances, any incoming message to one of the IM addresses may be forwarded to all of the other IM addresses at which the recipient is present.

In other embodiments, any incoming IM message may be forwarded to another IM address at which the recipient was last active. In this regard, if a recipient has been last active at an IM address at a workstation, then any incoming IM to the recipient's PDA may be forwarded to the workstation. Similarly, any incoming IM to the recipient's cellular telephone may be forwarded to the workstation. Thus, for this embodiment, the message-handling IM client is configured to direct any incoming IM message to the last-active location at which the recipient is present, thereby effectively following the recipient to the recipient's most-recently-active IM address. Since the last-active time is maintained by presence servers, the client may request the last-active time from the server using known mechanisms.

In other embodiments, approaches are presented in which incoming IM messages are transferred to another recipient. Hence, if a recipient receives an IM message, and the recipient is unable to reply to the message within a predefined time interval, then the message-handling IM client transfers the received IM message to a third-person transferee. The transfer of the IM message establishes an IM chat session between the sender and the transferee, rather than establishing an IM chat session between the sender and the recipient. While the several embodiments describe a recipient as receiving the IM message, it should be appreciated that the IM message is received through an IM client. In this regard, phrases such as "recipient receives an IM message" should be understood as being a shorthand notation for "recipient receives an IM message at the recipient's IM client." Similarly, all actions (e.g., transmit, forward, reply, etc.) attributed to users (e.g., sender, recipient, etc.) should be understood as being performed at an IM client associated with the corresponding user.

In other embodiments, approaches are presented in which two separate IM chat sessions are merged into a single IM chat session. For those embodiments, a recipient is already engaged in another IM session with an earlier sender. Thus, when a latter sender sends an IM message to the recipient, the latter sender is queried to determine whether or not the latter sender wishes to join the IM chat session between the earlier sender and the recipient. If the latter sender chooses to join the IM chat session between the earlier sender and the recipient, then the recipient is queried to determine whether or not the latter sender is permitted to join the IM chat session between the earlier sender and the recipient. If the recipient approves, then the IM chat session between the earlier sender and the recipient is merged with the IM chat session between the latter sender and the recipient. In other words, a single IM chat session (similar to a chat room) is established between the earlier sender, the latter sender, and the recipient. The single IM chat session may be established by using a recipient's IM client to bridge the chat session between the earlier sender and the latter sender.

Several aspects of the various embodiments are described in greater detail with reference to FIGS. 1 through 11B.

FIG. 1 is a block diagram showing an embodiment of a system having a message-handling instant messaging (IM) client 115a . . . 115c. As shown in FIG. 1, one embodiment of an IM system includes IM-capable devices 110, 120, 130, 140, 150, 160 that are communicatively coupled to the Internet 160. The IM-capable devices may include workstations 110, 140, 150, cellular telephones 120, personal digital assistants (PDA) 130, or any other programmable device that may be configured to engage in IM communications. For purposes of illustration, the several workstations 110, 140, 150 are separately labeled as a sender workstation 150, a recipient workstation 110, and a transferee workstation 140. Since both wired and wireless communication from IM-capable devices to the Internet 160 are known in the art, only a truncated discussion of the actual device-to-Internet connection is provided here.

In addition to the IM-capable devices 110, 120, 130, 140, 150, 160, the system further includes the Internet 160, which comprises a plurality of servers 165, 170, 175. For purposes of illustration, the sender workstation 150 is shown to be communicatively coupled to a sender server 165; the recipient workstation 110 is shown to be communicatively coupled to a recipient server 170; and the transferee workstation is shown to be communicatively coupled to the transferee server 175. Each of the servers 165, 170, 175 are either directly or indirectly coupled to each other within the Internet 160. Since the communication between servers within the Internet are known in the art, further discussion of server-to-server communications is omitted here. Also, it should be appreciated that, while an example embodiment shows the Internet as the transmission medium, other embodiments may be implemented in other networked environments.

Several examples are provided with reference to FIG. 1, in order to illustrate several embodiments of IM message handling by the message-handling IM client 115a . . . 115c. Hardware details of the various IM-capable devices are shown with reference to FIGS. 2 through 3B.

Using FIG. 1 to illustrate various embodiments of IM message handling, when a sender chooses to send an IM message to a recipient, the sender composes the IM message using the sender's IM client 155, which is running on the sender's workstation 150. Presuming that the recipient is logged in at a resource (e.g., workstation, cellular telephone, PDA, etc.), the composed IM message may be delivered to the recipient in near real-time. Since the determination of presence and their related statuses are known in the art, only a truncated discussion of presence and status determination is provided here. For example, when a user is present but unavailable, then the user's client provides an indication of unavailability to the server, which subsequently broadcasts the unavailability to the contacts who are present on the Internet. The contacts' clients display the appropriate message to the contacts, in accordance with methods known in the art.

Typically, the composed IM message at least includes information such as an intended recipient's IM address, the sender's IM address, and a content of the IM message. Hence, in some embodiments, including extensible markup language (XML)-based protocols, such as Jabber or other extensible messaging and presence protocol (XMPP) messaging protocols, the IM message may include relevant XML tags that delineate the sender, the recipient, and the body of the message. For example, an XMPP IM message in English, from juliet@capulet.com logged in at a resource (e.g., "balcony"), to romeo@montague.net, and having the text "Art thou not Romeo, and a Montague?" may appear as follows:

1 <message to=`romeo@montague.net` from=`juliet@capulet.com/balcony` xml:lang=`en` > <body>Art thou not Romeo, and a Montague?</body> </message>

Typically, in XMPP, all of the information in the XML stream is supplied by the client to the server. Hence, the server delivers the message from the sender to the recipient using the information in the XML stream. In this regard, once the IM message is transmitted from the sender's workstation 150 to the sender's server 165, the sender's server 165 locates the recipient's server 170, which is communicatively coupled to the recipient's workstation 110, at which the recipient is logged in. Thus, continuing with Romeo and Juliet's example above, when Juliet dispatches the IM message "Art thou not Romeo, and a Montague?" from the sender workstation 150 (also referred to herein as "Juliet's workstation"), the IM message is conveyed to the sender's server 165 (also referred to herein as "Juliet's server"). The sender's server 165 receives the IM message and, using the "to" delineation in the XML stream, locates the recipient's server 170 (also referred to herein as "Romeo's server"). Upon locating the recipient's server 170, the IM message is conveyed from the sender's server 165 to the recipient's server 170. The recipient's server 170 receives the IM message and further conveys the IM message to the recipient's workstation 110 (also referred to herein as "Romeo's workstation"). The IM message is rendered and displayed to Romeo, who is logged in at the recipient's workstation 110, by the message-handling IM client 115a. While the following examples describe Romeo and Juliet as transmitting and receiving IM chat messages, it should be appreciated that the IM chat messages, and their corresponding commands and data, are transmitted and received through Romeo and Juliet's respective message-handling IM clients. Hence, for example, the phrase "Romeo receives a message" should be understood as a shorthand notation for "Romeo receives a message through Romeo's message-handling IM client."

If Romeo is physically present at the recipient's workstation 110, and chooses to reply to Juliet, then the message-handling IM client 115a conveys any reply from Romeo back to Juliet. Hence, again using an XMPP example, if Romeo composes a message back to Juliet, saying "Neither, fair saint, if either thee dislike," then this message may be XML-tagged to appear as:

2 <message to=`juliet@capulet.com/balcony` from=`romeo@montague.net/orchard` xml:lang=`en` > <body>Neither, fair saint, if either thee dislike</body> </message>

The composed message by Romeo would then be transmitted from Romeo's workstation 110, cascaded through Romeo's server 170 and Juliet's server 165, and received by Juliet's workstation 150. A chat session would, thereafter, continue between Romeo and Juliet. If, however, Romeo is either not physically present at Romeo's workstation 110 or chooses not to reply to the IM message, then the message-handling IM client 115a may execute a variety of options.

In some embodiments, if Romeo does not reply to Juliet's IM message within a predefined time interval (e.g., within two minutes of receiving Juliet's IM message), the message-handling IM client 115a at Romeo's workstation may provide an auto-reply to Juliet's IM message. For example, in some embodiments, a predefined message may be sent back to Juliet on behalf of Romeo by the message-handling IM client 115a. For example, the predefined message may be a message that states "Romeo is unable to reply to your IM message at this moment." For those embodiments in which the message-handling IM client 115a provides an auto-reply, the message-handling IM client 115a may generate an XML stream similar to the following:

```
3    <message   to=`juliet@capulet.com/balcony`   from=
     `romeo@montague.net/orchard` xml:lang=`en`> <body>Romeo
     is unable to reply to your IM message at this moment.</body>
     </message>
```

The generated XML stream may be conveyed from Romeo's workstation 110 back to Juliet's workstation 150 in a manner similar to that described above.

In some embodiments, the IM message may be transmitted periodically to Juliet at predefined time intervals. Thus, for example, the IM message may be transmitted back to Juliet every three minutes, thereby informing Juliet that Romeo has not yet returned to Romeo's workstation 110.

In other embodiments, if Romeo is logged in at several IM addresses using several different resources (e.g., Romeo@montague.net on Romeo's workstation 110, Romeo@verona.it on Romeo's PDA 130, and Romeo@shakespeare.lit on Romeo's cellular telephone 120), then the message-handling IM client 115a may forward Juliet's IM message to each of the resources at which Romeo is logged on. Thus, for example, if Juliet's IM message is directed to Romeo@montague.net, then the message-handling IM client 115a at Romeo's workstation 110, which corresponds to Romeo's login under montague.net, receives the IM message.

Upon receiving the IM message from Juliet, if Romeo does not reply within a predefined time interval (e.g., within one minute of receiving Juliet's IM message), then the message-handling IM client 115a determines whether or not Romeo is present in another domain at another resource, in accordance with known methods, as described in RFC 2778 and 2779 and other known references. If the message-handling IM client 115a determines that Romeo is present in verona.it at Romeo's PDA 130, and also present in shakespeare.lit at Romeo's cellular telephone 120, then the message handling IM client 115a may generate the following XML streams:

```
4    <message   to=`romeo@verona.it`   from=`juliet@capulet.
     com/balcony` xml:lang=`en`> <body>Art thou not Romeo,
     and a Montague? </body> </message> and: <message
     to=`romeo@shakespeare.lit` from=`juliet@capulet.com/
     balcony` xml:lang=`en`> <body>Art thou not Romeo, and
     a Montague?</body> </message>
```

The generated XML streams are then transmitted to Romeo's server 170, which conveys the forwarded message to Romeo at his various resources (e.g., PDA and cellular telephone). As shown here, in some embodiments, the "from" line in the message may reflect that Juliet sent the message, even though Romeo's message-handling IM client 115a generated the message. Hence, when Romeo replies from any of the resources at which he is present, an IM chat session is established between Romeo and Juliet, rather than being established between two of Romeo's IM resources.

In other embodiments, IM messages may be conveyed to Romeo's most-recently-used IM address, rather than conveying the IM messages to all of Romeo's IM addresses. In doing so, the message-handling IM client 115a may determine Romeo's presence as well as the last active time of Romeo at each of those resources. For those embodiments, the message-handling IM client 115a determines Romeo's presence using known presence mechanisms. Upon determining Romeo's presence, the message-handling IM client 115a ascertains a last active time of Romeo at each of Romeo's IM addresses at which he is present. Since the ascertaining of last active times is known in the art, further discussion of ascertaining last-active-times is omitted here. Once the last active times for all of Romeo's IM addresses have been ascertained, the message-handling IM client 115a determines the most recent last active time. The IM message from Juliet is then conveyed to the IM address that corresponds to Romeo's most recent last active time. Hence, if Romeo was most-recently-active at montague.net on Romeo's workstation 110, then Juliet's IM message, which originally arrived at Romeo's workstation 110, will not be forwarded to any of Romeo's other resources since Romeo's workstation 110 corresponds to the most recent last active time. On the other hand, if Romeo was most-recently-active at verona.it on Romeo's PDA 130, then the message-handling IM client 115a may generate and transmit the following XML stream:

```
5   <message  to=`romeo@verona.it`  from=`juliet@capulet.
    com/balcony` xml:lang=`en`> <body>Art thou not Romeo, and a
    Montague?</body> </message>
```

Similarly, if Romeo was most-recently-active at shakespeare.lit on Romeo's cellular telephone 120, then the message-handling IM client 115a may generate and transmit the following XML stream:

```
6 <message to=`romeo@shakespeare.lit` from=`juliet@capulet.
  com/balcony` xml:lang=`en`> <body>Art thou not Romeo, and a
  Montague?</body> </message>
```

As seen from these embodiments, Juliet's IM message follows Romeo to Romeo's most-recently-active resource, thereby resulting in a greater probability of actual IM communications between Romeo and Juliet.

In some embodiments, in addition to forwarding the IM message to Romeo at Romeo's other resources, the message-handling IM client 115a may also generate an IM to Juliet to notify her that the IM message is being forwarded to Romeo at another resource. In other embodiments, the message-forwarding feature and the auto-reply feature may be combined such that, rather than forwarding the message to Romeo's other resources, an IM message may be transmitted back to Juliet to inform Juliet that Romeo is currently logged on at another resource. That IM message may include Romeo's most-recently-active IM address, thereby permitting Juliet to send an IM directly to Romeo's most-recently-active IM address.

In yet another embodiment, if Romeo does not reply to Juliet within a predefined time interval (e.g., within three minutes), then Juliet's IM message may be forwarded to another recipient at a transferee workstation 140. Thus, for example, Romeo may configure the message-handling IM client 115a to redirect all of the IM messages to mercutio@verona.it in the event that Romeo cannot immediately respond to incoming IM messages. Thus, for example, if Romeo again receives an IM message from Juliet, and does not respond within three minutes, then the message-handling IM client 115a may generate the following XML stream:

```
7  <message  to= mercutio@verona.it  from= juliet@capulet.
   com/balcony   xml:lang= en > <subject>Auto-transfer of Message
   from Romeo@montague.net</subject> <body>Art thou not Romeo,
   and a Montague?</body> </message>
```

As shown in this example, the XML stream may include a subject line that indicates that the message has been automatically transferred to Mercutio from Romeo. Additionally, the XML stream maintains Juliet's "from" address so that Mercutio may directly communicate with Juliet using IM, since the call has been transferred to Mercutio from Romeo.

In some embodiments, the message-handling IM client 115a may request permission from Juliet prior to transferring her to Mercutio. For those embodiments, the message-handling IM client 115a may reply back to Juliet using the following XML stream:

```
8   <message   to= juliet@capulet.com/balcony   from=
    romeo@montague.net/orchard  xml:lang= en > <body>Romeo
    is unavailable at the moment. Would you like to continue the IM chat
    session with Romeo's representative?</body> </message>
```

If Juliet indicates that she would like to continue in an IM chat session with Romeo's representative, then the above message to Mercutio may be transmitted to Mercutio by the message-handling IM client 115a. Conversely, if Juliet indicates that she would not like to be transferred to Romeo's representative, then the message-handling IM client 115a may take no action.

In other embodiments, when Juliet indicates that she would like to be transferred, the message-handling IM client may convey Juliet's IM message to Mercutio and, also, identify Mercutio to Juliet, thereby specifically informing Juliet that the IM message has been conveyed to Mercutio. In this regard, the message-handling IM client may generate and convey two XML streams:

```
9  <message to= mercutio@verona.it  from= juliet@
capulet.com/balcony   xml:lang= en > <subject>Auto-transfer
of Message from Romeo@montague.net</subject> <body>Art thou not
Romeo,   and   a   Montague?</body>    </message>
and:    <message to= juliet@capulet.com/balcony   from=
 romeo@montague.net/orchard   xml:lang= en > <body>
Your IM message to Romeo has been transferred to Mercutio.
</body> </message>
```

In some embodiments, the message-handling IM client 115a may merge two or more independent IM chat sessions into a single IM chat session. For example, an IM chat session between Juliet and Mercutio may be merged with an IM chat session between Juliet and Romeo. The merging of the two IM chat sessions results in a single IM chat session between Juliet, Romeo, and Mercutio. For those embodiments, Juliet may be engaged in an IM chat session with Romeo, when Mercutio sends an IM message to Juliet. Since Juliet is already engaged in the IM chat session with Romeo, the message-handling IM client 115a queries Mercutio to determine whether or not Mercutio wishes to join the IM chat session that is already in progress between Juliet and Romeo. In this regard, the message-handling IM client 115a generates and conveys an XML stream that identifies the IM chat session between Romeo and Juliet. The XML stream may appear as:

```
10 <message to= mercutio@verona.it  from= juliet@capulet.
   com/balcony  xml:lang= en > <body>Juliet is currently engaged
   in an IM chat session with Romeo. Do you wish to join Romeo
   and Juliet's IM chat session?</body> <thread>
   e0ffe42b8561960c6b12b944a0927-94b9683a38 </thread>
   </message>
```

In the event that Mercutio has a message-handling IM client 115b, that IM client may display the query in the form of a dialogue box with user-selectable options, or other known graphical user interfaces (GUI). In the event that Mercutio has a conventional IM client, the query may appear as a standard IM chat message. Hence, when Mercutio replies to that IM chat message, Juliet's message-handling IM client 115a may be configured to process the reply from Mercutio. The components associated with prompting Mercutio are described in greater detail below.

Upon being queried, if Mercutio indicates that he wishes to join Romeo and Juliet's IM chat session by, for example, providing input at the GUI, then the message-handling IM client 115a queries Juliet to determine whether or not Mercutio is welcome to join Romeo and Juliet's IM chat session. An XML stream for such a query may appear as:

```
11    <message    to= juliet@capulet.com/balcony    from=
  juliet@capulet.com/balcony   xml:lang= en   > <body>
  Mercutio has requested to participate in the IM chat session between
  you   and   Romeo </body> <thread>
  e0ffe42b8561960c6b12b944a092794b9683a38</thread> </message>
```

If Juliet approves of Mercutio's participation, then a three-way IM chat session is established between Juliet, Romeo, and Mercutio. In some embodiments, Mercutio may be a contact on the IM roster for both Romeo and Juliet. For other embodiments, Mercutio need not be a contact on either IM roster. For yet other embodiments, Mercutio may be a contact on either Romeo's IM roster or Juliet's IM roster. Similarly, the embodiments disclosed herein may be independent of whether or not various communicants are listed as contacts on the other communicants' IM rosters.

Also, for some embodiments, Mercutio's exchange with Juliet may be revealed to Romeo. Conversely, for other embodiments, Mercutio's exchange with Juliet may be hidden from Romeo. It should be appreciated that the various permutations that are possible are within the technical competence of one having ordinary skill in the art. Hence, the plethora of permutations in implementing the message-handling IM client 115a is omitted here.

Optionally, for other embodiments, the message-handling IM client 115a may query both Juliet and Romeo to determine whether or not Romeo, as well as Juliet, wishes to include Mercutio in the IM chat session. In this regard, the XML stream may appear as:

```
12    <message    to= juliet@capulet.com/balcony    to=
 romeo@montague.net/orchard  from= juliet@capulet.com/ba-  lcony
 xml:lang= en >   <body>Mercutio  has  requested  to
```

-continued

```
participate   in   the   IM   chat   session   between
you   and   Romeo</body> <thread>
e0ffe42b8561960c6b12b944a092794b- 9683a38 </thread> </message>
```

For those embodiments, if both Romeo and Juliet approve of Mercutio's participation, then a three-way IM chat session may be established between Juliet, Romeo, and Mercutio. In other embodiments, if either Romeo alone, or Juliet alone, approves of Mercutio's participation, then a three-way IM chat session may be established between Juliet, Romeo, and Mercutio.

The three-way IM chat session may be seen as a merging of two separate IM chat sessions: the IM chat session between Juliet and Romeo (an IM chat session that is already in progress), and the IM chat session between Juliet and Mercutio (a newly-established IM chat session). Once the three-way IM chat between Juliet, Romeo, and Mercutio is established, for example, by reflecting all messages from Juliet, Romeo, and Mercutio to all of the participants, the three participants may continue in their joint chat session as if they were participating in a private chat room. Since exchanging of messages in chat room is known in the art, further discussion of the three-way chat is omitted here.

As shown from the embodiments above, by providing auto-reply mechanisms, auto-forwarding mechanisms, auto-message-transfer mechanisms, and IM chat-session merging mechanisms, the message-handling IM client 115a provides greater versatility in IM communications than previously available.

Figure 2:
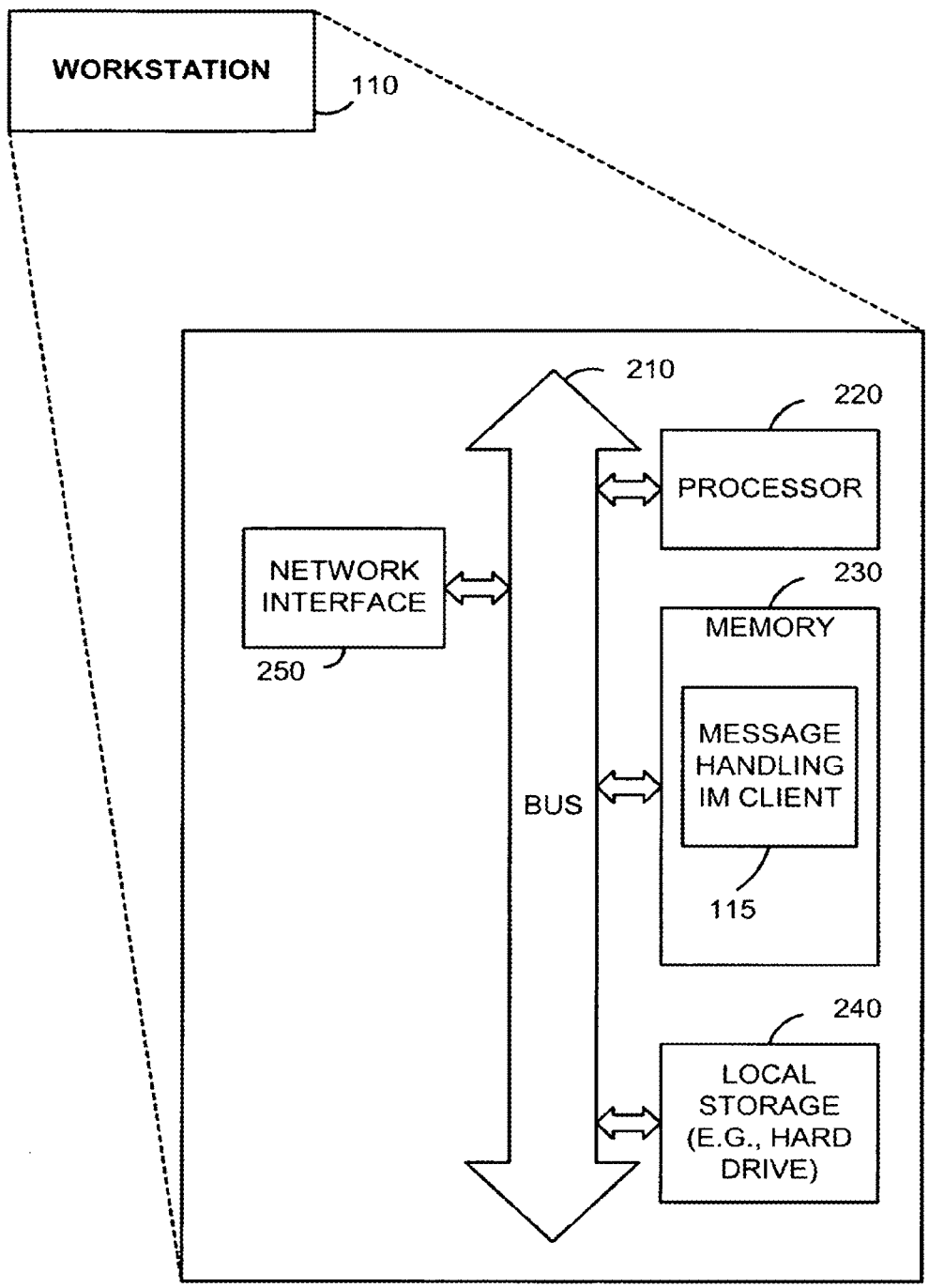
FIG. 2 is a block diagram showing the workstation of FIG. 1 in greater detail.

FIG. 2 is a block diagram showing the workstation of FIG. 1 in greater detail. Since the embodiments above show Romeo's workstation 110 as handling all auto-replies, auto-forwards, and auto-message-transfers, only the components of the workstation 110 are shown in FIG. 2. However, it should be appreciated that the PDA 130 and the cellular telephone 120 may also include a similar component architecture.

As shown in FIG. 2, the recipient workstation 110 comprises a system board that includes a processor 220, a network interface 250, a memory 230, a local storage device 240, and a bus 210 that permits communication between the various components. In one example, the local storage device 240 may be a hard drive configured to electronically store data. The local storage device 240 may also store computer programs that execute on the recipient workstation 110. In this sense, the processor 220 is configured to access any program that is stored on the local storage device 240, and execute the program with the assistance of the memory 230. As shown in FIG. 2, the memory 230, in one embodiment, includes a message-handling IM client 115a. Since the functioning of computing devices is well known in the art, further discussion of the processor 220, the memory 230, and the local storage device 240 are omitted here. Also, since various functions of the message-handling IM client 115a are discussed in great detail with reference to FIG. 1, further details of the message-handling IM client 115a are omitted here. While the various components are shown as residing on a single system board, it will be clear to one of ordinary skill in the art that the various components may reside at different locations, so long as they are coupled to each other to allow communication between the components.

The network interface 250 of FIG. 2 is configured to provide an interface between the recipient workstation 110 and the server hardware 165, 170, 175 in the Internet 160. Thus, the network interface 250 provides the interface for the recipient workstation 110 to receive any data that may be entering from the Internet 160 and, also, to transmit any data from the recipient workstation 110 to the Internet 160. In this regard, the network interface 250 may be a modem, a network card, or any other interface that interfaces the recipient workstation 110 to a network.

Figure 3A:
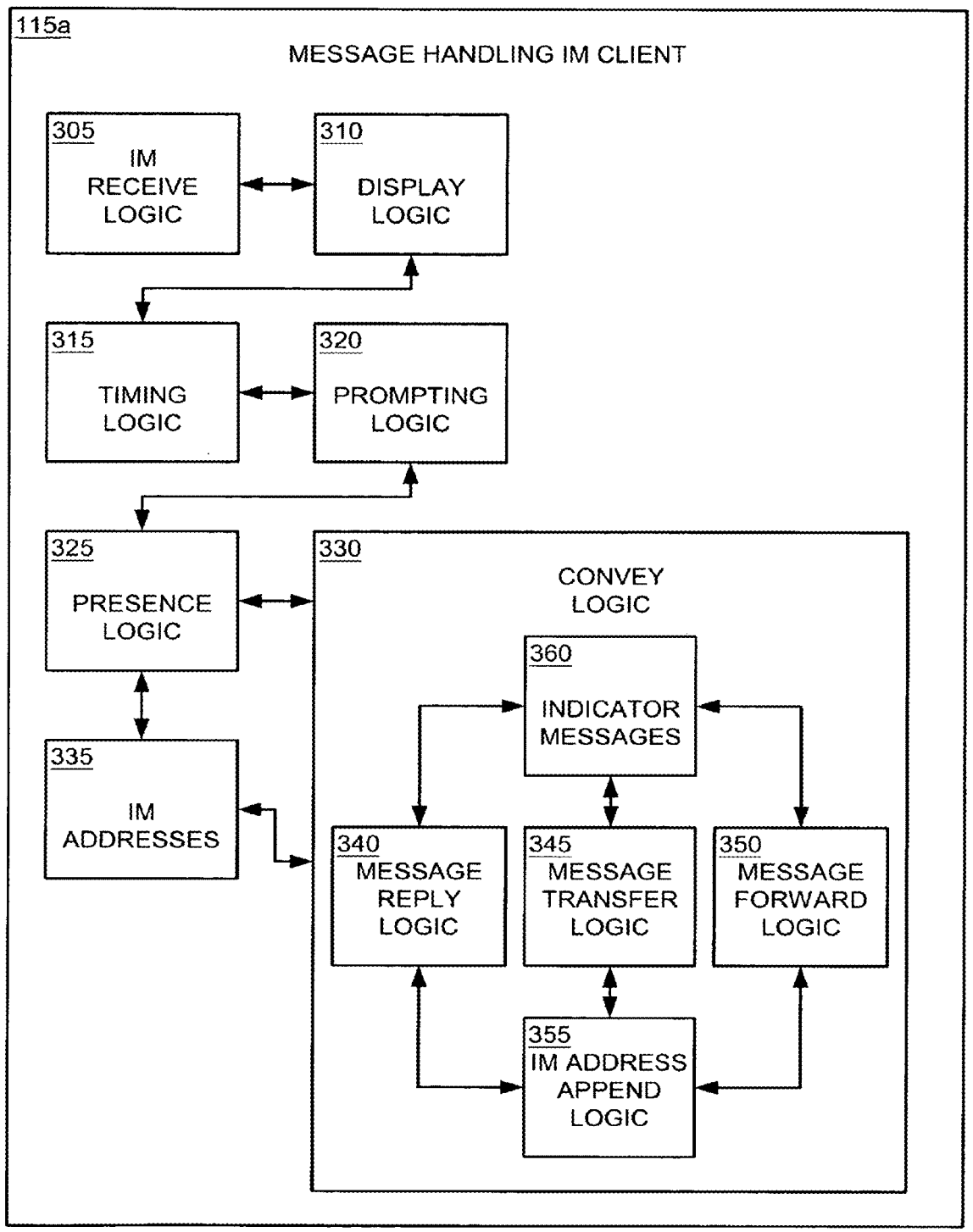
FIG. 3A is a block diagram showing an embodiment having logic components of the message-handling IM client of FIGS. 1 and 2.

FIG. 3A is a block diagram showing, in greater detail, an embodiment of the message-handling IM client 115a of FIGS. 1 and 2. In this regard, FIG. 3A dissects the various functions of one embodiment of the message-handling IM client 115a of FIG. 1 into its corresponding structural components. As shown in FIG. 3A, the message-handling IM client 115a comprises IM receive logic 305, display logic 310, timing logic 315, prompting logic 320, presence logic 325, and convey logic 330.

The IM receive logic 305 is adapted to receive and process incoming IM messages. Hence, when Juliet sends an IM message to Romeo, the IM receive logic 305 receives Juliet's IM message and processes the IM message. The display logic 310 is configured to display the received and processed IM message. Hence, the display logic 310 renders Juliet's IM message for display on Romeo's workstation 110. In some embodiments, the receiving of Juliet's IM message and the displaying of Juliet's IM message happen substantially contemporaneously. It should be appreciated that the displaying of the IM message refers to any one of: displaying the IM chat window, displaying a minimized IM chat window and a corresponding icon for the IM chat window, displaying a visual indication of a received IM message, etc.

The timing logic 315 tracks the elapsed time from when Juliet's IM message is displayed for Romeo. In this regard, for some embodiments, the timing logic 315 also serves as a trigger for any auto-replying, auto-forwarding, or auto-transferring of Juliet's IM messages. As is known in the art, the default time for triggering such events may be set by the user or may be hard-coded into the message-handling IM client 115a. Since the setting of such user preferences is known in the art, further discussion of the setting of user preferences is omitted here.

The prompting logic 320 is configured to prompt the user for additional input. For example, in the auto-forwarding embodiments described above, the prompting logic 320 is configured to prompt Juliet for input on whether or not Juliet wishes to forward her IM message to Romeo's other IM addresses. In the auto-transferring embodiments, the prompting logic 320 is configured to prompt Juliet to determine whether or not Juliet wishes to be transferred to Mercutio.

The presence logic 325 is configured to determine Romeo's presence at all of Romeo's IM addresses. Additionally, the presence logic 325 is configured to determine the presence of all of Romeo's IM contacts. Presence is determined using a variety of known presence mechanisms, which are not discussed herein.

The convey logic 330 is configured to convey the generated XML streams from the workstation 110 to the various intended recipients (e.g., Juliet and Mercutio). In this regard, the convey logic 330 may further be seen as comprising indicator messages 360, message reply logic 340, message transfer logic 345, message forward logic 350, and IM address append logic 355. Additionally, the message-handling IM client 115 further comprises IM addresses 335 for Romeo's other IM accounts.

The message reply logic 340 is configured to generate and convey an auto-reply message in response to receiving an IM message from a sender. The message transfer logic 345 is configured to generate and convey all IM messages that may be used in the event that an incoming IM message is transferred to a transferee. The message forward logic 350 is configured to determine the presence of the recipient at all of the recipient's IM addresses, and, also, to determine the last active time for each of those IM addresses. Additionally, the message forward logic 350 is configured to generate and convey all IM messages that may be used in the event that an incoming IM message is forwarded to another of the recipient's IM addresses.

The indicator messages 360 include all messages that are used in generating the XML streams Thus, for example, the indicator messages 360 may include an auto-reply message that reads, for example, "Romeo is currently unavailable to reply to your IM message." For auto-forward, the indicator messages 360 may read "Romeo has most recently been active at romeo@verona.it" or "Your message is being forwarded to Romeo at romeo@verona.it." For auto-transferring, the indicator messages may read "Your message is being forwarded to Mercutio." While not explicitly provided, it should be appreciated that any message to be included in the auto-message-handling process may be stored as one of the indicator messages 360.

The IM address append logic 335 is configured to append the proper IM address to generated IM messages. Thus, for example, if an auto-reply message is generated, then the IM address append logic 335 is configured to append the original sender's IM address to the automatically-generated IM message. In the above example, if an auto-reply is generated in response to Juliet's IM message, then the IM address append logic 335 will append Juliet's IM address to the generated auto-reply message.

Similarly, if an auto-forward message is generated, then, for some embodiments, the IM address append logic 335 is configured to append all of Romeo's present IM addresses to each of the generated IM messages. For other embodiments, the IM address append logic 335 is configured to append Romeo's most-recently-active IM address to the generated IM message.

For auto-transferring embodiments, the IM address append logic 335 is configured to append the transferee's IM address to the generated IM message. For example, if Mercutio is the transferee, then the IM address append logic 335 appends Mercutio's IM address to the generated IM message.

As shown in the embodiment of FIG. 3A, the message-handling IM client 115 comprises structural components that are configured to perform the various IM functions as described with reference to FIG. 1, and, also, to perform various conventional IM functions. Moreover, as shown in FIGS. 1 through 3B, systems with added functionality in handling IM messages provide a more versatile IM environment.

Having described several embodiments of systems for handling IM messages, attention is turned to FIGS. 4 through 10B, which describe several embodiments of methods for handling IM messages. While the methods of FIGS. 4 through 10B may be implemented by the systems described in FIGS. 1 through 3B, it should be appreciated that other systems may be used to implement the processes of FIGS. 4 through 10B, and, hence, the processes of FIGS. 4 through 10B are not limited to the systems of FIGS. 1 through 3B.

Figure 3B:
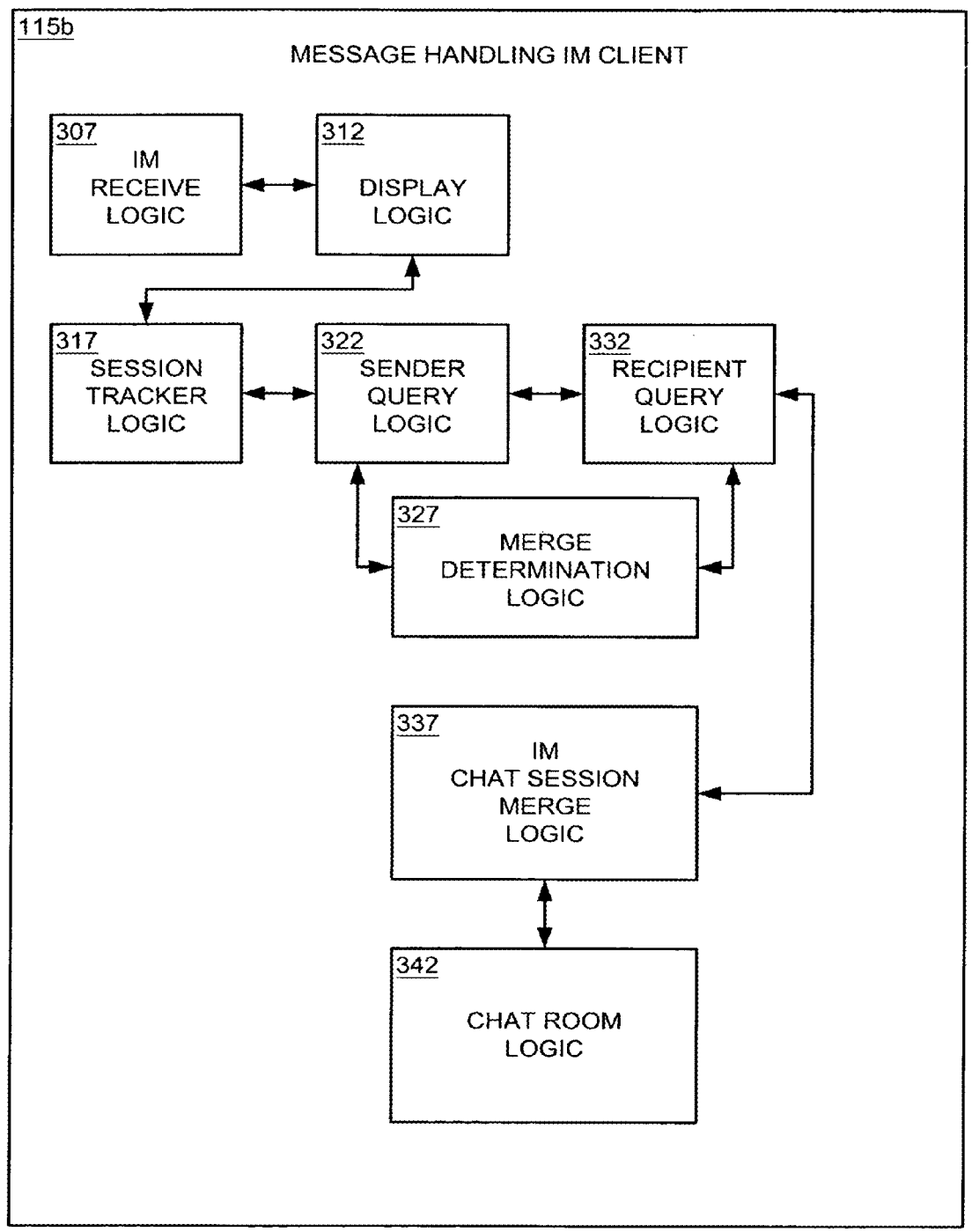
FIG. 3B is a block diagram showing another embodiment having logic components of the message-handling IM client of FIGS. 1 and 2.

FIG. 3B is a block diagram showing, in greater detail, an embodiment of the message-handling IM client 115a of FIGS. 1 and 2. In this regard, FIG. 3B dissects the various functions of one embodiment of the message-handling IM client 115a of FIG. 1 into its corresponding structural components. As shown in FIG. 3B, the message-handling IM client 115a comprises IM receive logic 307, display logic 312, session-tracker logic 317, sender-query logic 322, recipient-query logic 332, merge-determination logic 327, IM chat-session-merge logic 337, and chat-room logic 342.

The IM receive logic 307 is adapted to receive and process incoming IM messages. Hence, when Juliet sends an IM message to Romeo, the IM receive logic 307 receives Juliet's IM message and processes the IM message. The display logic 312 is configured to display the received and processed IM message. Hence, the display logic 312 renders Juliet's IM message for display on Romeo's workstation 110. In some embodiments, the receiving of Juliet's IM message and the displaying of Juliet's IM message happen substantially contemporaneously.

The session-tracker logic 317 is adapted to track ongoing chat sessions established by the message-handling IM client 115b. In this regard, the session-tracker logic 317 determines whether or not the recipient is engaged in one or more IM chat sessions with one or more senders. Thus, for example, if Juliet (recipient) is engaged in an IM chat session with Romeo (one sender) as well as with Mercutio (another sender), then the session-tracker logic 317 keeps track of those IM chat sessions. In other words, the session-tracker logic 317 tracks whether the IM chat session between Juliet and Romeo has terminated or is continuing. Similarly, the session-tracker logic 317 tracks whether the IM chat session between Juliet and Mercutio is continuing or has terminated.

The sender-query logic 322 is adapted to send appropriate queries to one or more senders. Thus, for example, when the message-handling IM client 115b determines that a sender is to be provided with an invitation to join an IM chat session already in progress, the sender-query logic 322 generates the appropriate invitation. Similarly, the recipient-query logic 332 is adapted to send appropriate queries to the recipient. Thus, for example, when the message-handling IM client 115b receives a request to join an IM chat session from a sender, the recipient-query logic 332 queries the recipient for permission to include the sender in an IM chat session already in progress.

The merge-determination logic 327 collects and compiles the replies that are received in response to the queries generated by the sender-query logic 322 and the recipient-query logic 332. Thus, for example, when the sender-query logic 322 generates an invitation to the sender to join an already-established IM chat session, and the sender replies to the invitation, the merge-determination logic 327 determines whether or not sender has accepted or rejected the invitation. This determination may be accomplished by processing input provided by a sender at, for example, a GUI at the sender's IM client, and received by the message-handling IM client 115a of the recipient. Similarly, when the recipient-query logic 332 queries the recipient for permission to include the sender in the already-established IM chat session, and the recipient replies to the query, the merge-determination logic 327 determines whether or not the recipient has granted permission or denied permission to the sender. This determination is accomplished by processing input that may be provided by the recipient. Thus, the merge-determination logic 327 compiles the replies from both the sender and the user to determine whether or not IM chat sessions should be merged together.

The IM chat-session-merge logic 337 merges multiple IM chat sessions into a single IM chat session in response to the merge-determination logic 327 determining that the IM chat sessions should be merged. In this regard, the IM chatsession-merge logic 337 gathers information needed to convert multiple chat sessions into a single IM chat room. In some embodiments, this information includes sender IM information for each of the senders, the recipient's IM information, and IM thread information.

The chat-room logic 342 is adapted to convert an IM chat session between a sender and a recipient into an IM chat room between the recipient and multiple senders. In this regard, the information gathered by the IM chat-session-merge logic 337 is combined so that the messages from all of the participants are reflected to all of the other participants. The various functions corresponding to the IM receive logic 307, the display logic 312, the session-tracker logic 317, the sender-query logic 322, the recipient-query logic 332, the merge-determination logic 327, the IM chat-session-merge logic 337, and the chat-room logic 342 are discussed below with reference to FIGS. 8 through 10B.

As shown in the embodiment of FIG. 3B, the message-handling IM client 115 comprises structural components that are configured to perform the various IM functions as described with reference to FIG. 1, and, also, to perform various conventional IM functions. Moreover, as shown in FIGS. 1 through 3B, systems with added functionality in handling IM messages provide a more versatile IM environment. As with FIG. 3A, the structures as shown are not indicative of programming logical structures in all embodiments.

Having described several embodiments of systems for handling IM messages, attention is turned to FIGS. 4 through 10B, which describe several embodiments of methods for handling IM messages. While the methods of FIGS. 4 through 10B may be implemented by the systems described in FIGS. 1 through 3B, it should be appreciated that other systems may be used to implement the processes of FIGS. 4 through 10B, and, hence, the processes of FIGS. 4 through 10B are not limited to the systems of FIGS. 1 through 3B.

FIG. 4 is a flowchart showing an embodiment of a method for automatically replying to IM messages when an IM recipient does not respond for a predefined time interval. As shown in FIG. 4, an embodiment of the process begins when an IM message from a sender is received (410) by a recipient. The received IM message is then displayed (420) to the recipient. In some embodiments, the IM message may be rendered and displayed by a message-handling IM client 115a similar to that shown in FIGS. 1 through 3B. Upon displaying the IM message, the IM system waits (430) for a predefined time interval for any response from the recipient. In some embodiments, the system waits a predefined time interval for the recipient to reply to the displayed IM message. When the predefined time interval elapses, the system determines (440) whether or not there has been a response to the received IM message from the recipient. If there has been a response by the recipient, then an IM chat session is established (450) between the sender of the IM message and the recipient. If, on the other hand, no response has been provided by the recipient during the time interval, then a message, which indicates that the recipient is unavailable to engage in an IM chat session, is provided (460). This message is transmitted to the sender. Additionally, a message, which requests the sender to wait for a predetermined time interval, may also be provided (470) and also transmitted to the sender. In some embodiments, the messages may be XML streams that are decipherable by IM clients. As such, the messages provided to the recipient may be, for example:

```
13 <message to=`sender@sdomain.com/sresource` from=
recipient @rdomain.com/rresource xml:lang=`en`>
<body>AUTO-REPLY MESSAGE FROM
RECIPIENT TO SENDER</body> </message>
```

It should be appreciated that the auto-reply message included in the body of the IM message may be custom-tailored by the auto-replier.

Figure 5:
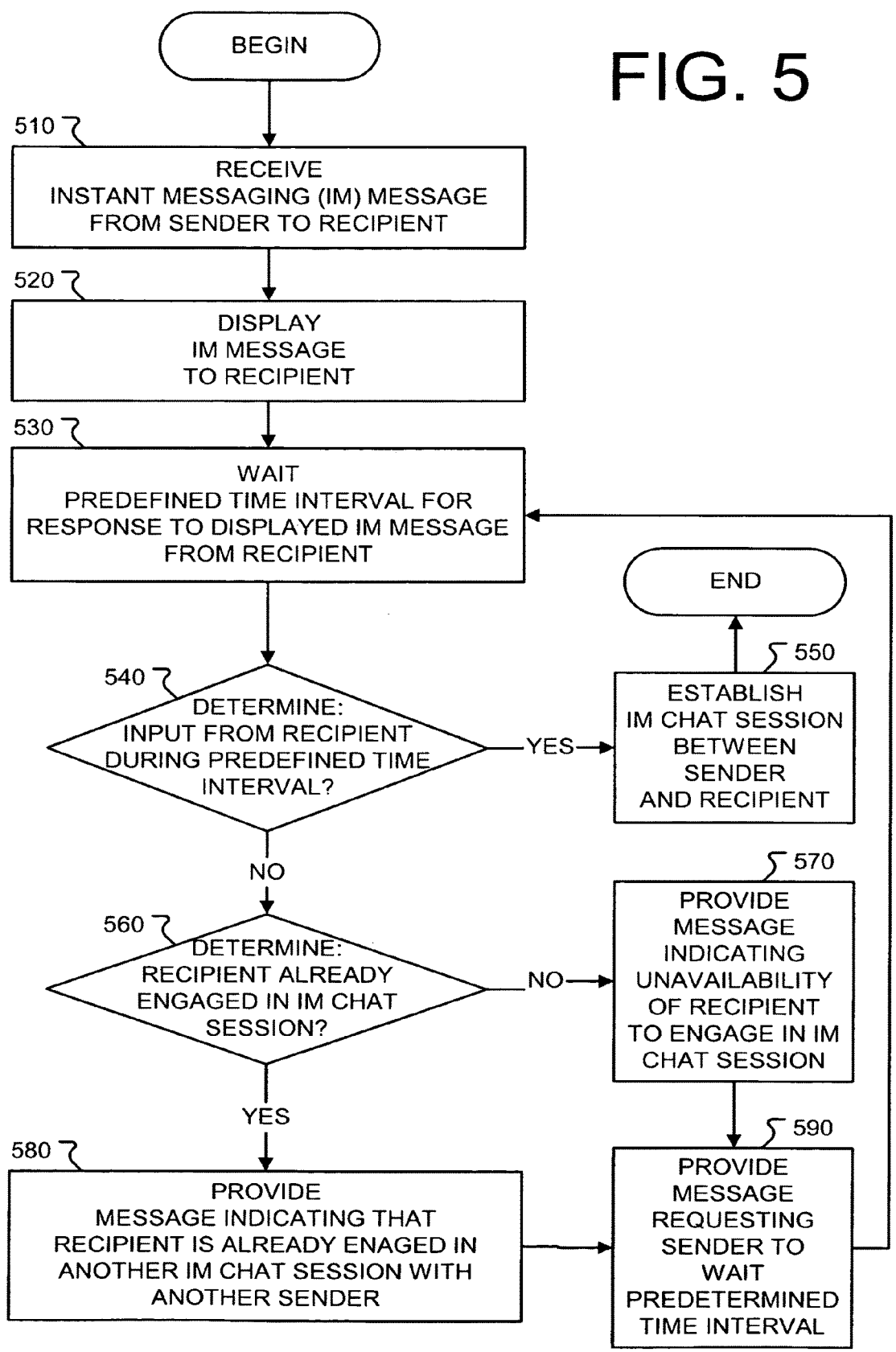
FIG. 5 is a flowchart showing an embodiment of a method for automatically replying to an IM message from a first IM sender when a recipient is engaged in an IM session with a second IM sender.

FIG. 5 is a flowchart showing another embodiment of a method for automatically replying to an IM message from a first IM sender when a recipient is engaged in an IM session with a second IM sender. For this embodiment, the process begins when an IM message from a sender is received (510) by a recipient. The received IM message is then displayed (520) to the recipient, and, thereafter, the system waits (530) a predefined time interval for any response from the recipient. After the predefined time interval elapses, the system determines (540) whether or not the recipient has provided any response to the displayed IM message. If the recipient has provided a response, then the an IM chat session is established (550) between the sender of the IM message and the recipient of the IM message. If, on the other hand, no response has been provided to the displayed IM message, then the system further determines (560) whether or not the recipient is already engaged in an IM chat session with another IM contact. If the recipient is not already engaged in another IM chat session with another IM contact, then a message, which indicates that the recipient is unavailable to engage in an IM chat session with the sender, is provided (570) to the sender of the IM chat message. Additionally, another message, which requests the sender to wait for a predefined time interval, may also be provided (590). Upon providing (570, 590) messages to the sender, the process repeats from the waiting step (530). If the recipient, however, is already engaged in an IM chat session with another IM contact, then a message, which indicates that the recipient is already engaged in an IM chat session with another IM contact, is provided (580) to the sender. Thereafter, a message, which requests the sender to wait for a predetermined time interval, may also be provided (590) to the sender. Upon providing (580, 590) the messages to the sender, the process repeats from the waiting step (530). Similar to the embodiment of FIG. 4, the messages provided to the sender may be composed and embedded in XML streams, thereby permitting deciphering by the sender's IM client.

Figure 6:
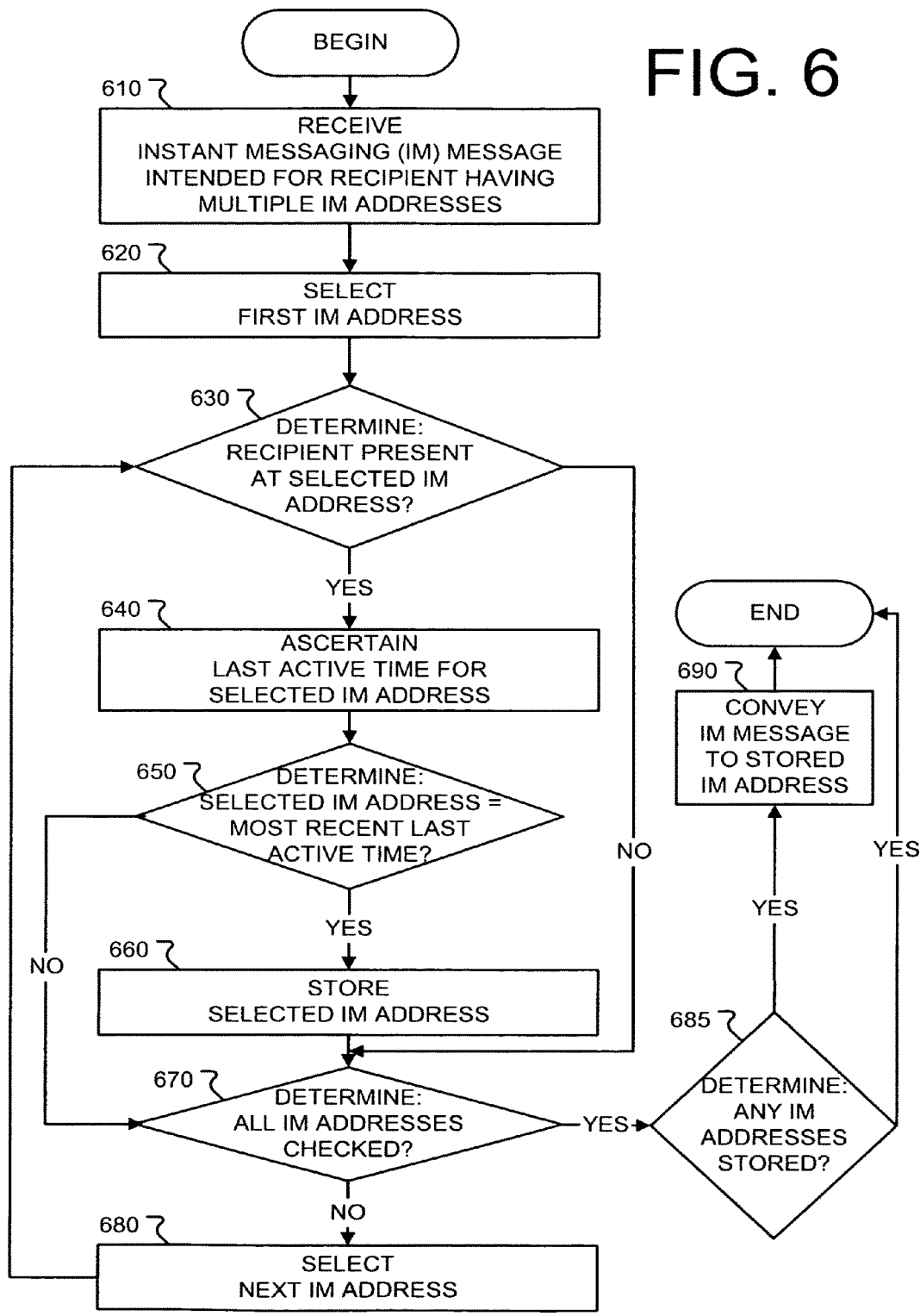
FIG. 6 is a flowchart showing an embodiment of a method for forwarding IM messages to a recipient at different IM clients.

FIG. 6 is a flowchart showing an embodiment of a method for forwarding IM messages to a recipient at different IM clients. In some embodiments, the message-forwarding process may begin when an IM message from a sender is received (610) by a recipient who has multiple IM addresses. Upon receiving the IM message, one of the multiple IM addresses is selected (620). Thereafter, the system determines (630) whether or not the recipient is present at the selected IM address.

If it is determined (630) that the recipient is present at the selected IM address, then the system ascertains (640) the last-active time for the selected IM address. The system then determines (650) whether or not the selected IM address has the most recent last active time. If it is determined that, of those IM addresses in which last active times have been ascertained, the selected IM address has the most recent last active time, then the selected IM address is stored as the target IM address, and the system proceeds to determine (670) whether or not all IM addresses have been checked for presence and last active time. If all IM addresses have been checked for presence and last active time, then the system further determines (685) whether or not a most-recently-active IM address has been stored. If a most-recently-active IM address has been stored, then an IM message is conveyed (690) to the stored, most-recently-active IM address. If no IM address has been stored, then the process terminates without conveying any IM messages.

It should be appreciated that the most-recently-active IM address may also be used in conjunction with other presence criteria to determine proper routing of the IM message. For example, if the most-recently-active IM address has a presence setting that is indicative of unavailability (e.g., "extended away," "do not disturb," etc.), then the process, in some embodiments, may disregard the most-recently-active IM address due to the presence setting that conveys unavailability of the recipient at that IM address. In this regard, for some embodiments, the most-recently-active IM address may be seen as the most-recently-active IM address at which the recipient is indicated as being available.

Returning to the determination (670) of whether or not all IM addresses have been checked, if the system determines (670) that all of the recipient's IM addresses have not been checked, then the system selects (680) another IM address and again determines (630) whether or not the recipient is present at the selected IM address. Thereafter, the process continues as described above.

Continuing with the determination (650) of the most recent last active time, if it is determined (650) that the selected IM address does not have the most recent last active time, then the system proceeds, without storing the selected IM address, to determine (670) whether or not all IM addresses have been checked, and the process continues as described above.

Returning to the presence-determining step (630), if it is determined (630) that the recipient is not present at the selected IM address, then the system proceeds to determine (670) whether or not all of the recipient's IM addresses have been checked for presence. If all of the recipient's IM addresses have been checked for presence, and the process continues as described above.

As shown in FIG. 6, if an IM recipient is concurrently logged in at many different resources under many different IM accounts, the received IM message may be conveyed to the recipient's most-recently-active IM address. The conveying of the IM message to the most-recently-active IM address permits the sender to follow the IM recipient as the recipient's IM activity switches from one resource to another resource. While not explicitly shown in FIG. 6, it should be appreciated that, rather than conveying the IM message to one most-recently-active IM address, the IM message may be conveyed to all of the recipient's IM addresses at which the user may, or may not, be present. This type of "shotgun" approach ensures the sender that the recipient will most likely receive the IM at one of the recipient's IM addresses.

While not explicitly shown in FIG. 6, it should be appreciated that the sender may be prompted for permission to forward the IM message prior to forwarding the IM message. In this regard, the process may include a prompting step that is similar to that shown below in FIG. 7. For those embodiments that request permission from the sender, the process may further provide an option for the sender to convey the IM message to the originally-designated IM address and mark the IM message as being "urgent." This option may be provided in the form of user-selectable entries in a graphical user interface or other technically-feasible user interfaces, which are known in the art. Alternatively, this option may be implemented by supplying an additional comment line to the sender.

While the embodiment of FIG. 6 shows the IM message being forwarded to one of the recipient's IM addresses, it should be appreciated that the IM message may be routed to the recipient without utilizing the presence transport of IM. For example, rather than determining the recipient's presence, the IM message may be forwarded to the recipient's cellular telephone via a short message service (SMS) protocol, which is known in the art. Similarly, the IM message may also be converted to speech and conveyed as a voice mail message using known text-to-speech protocols. In this regard, it should be appreciated that the IM message may be encapsulated for transport in any known medium, thereby permitting a sender to convey the IM message to the recipient using non-IM transport mechanisms. Since non-IM transport media are known in the art, further discussion of non-IM transport media are not discussed further. Additionally, it should be appreciated that known mechanisms may be used for transporting the substance of the IM messages on the corresponding transport medium. Since various text-transport mechanisms are known in the art, further discussion of text-transporting mechanisms is omitted here.

In some embodiments, the IM message may be forwarded by a message-handling IM client 115 similar to that shown in FIGS. 1 through 3B. For those embodiments, the message-handling IM client 115 appends the sender's IM information to the forwarded IM message, thereby permitting the recipient to establish an IM chat session from any of the recipient's IM resources from which the recipient is logged on.

Figure 7:
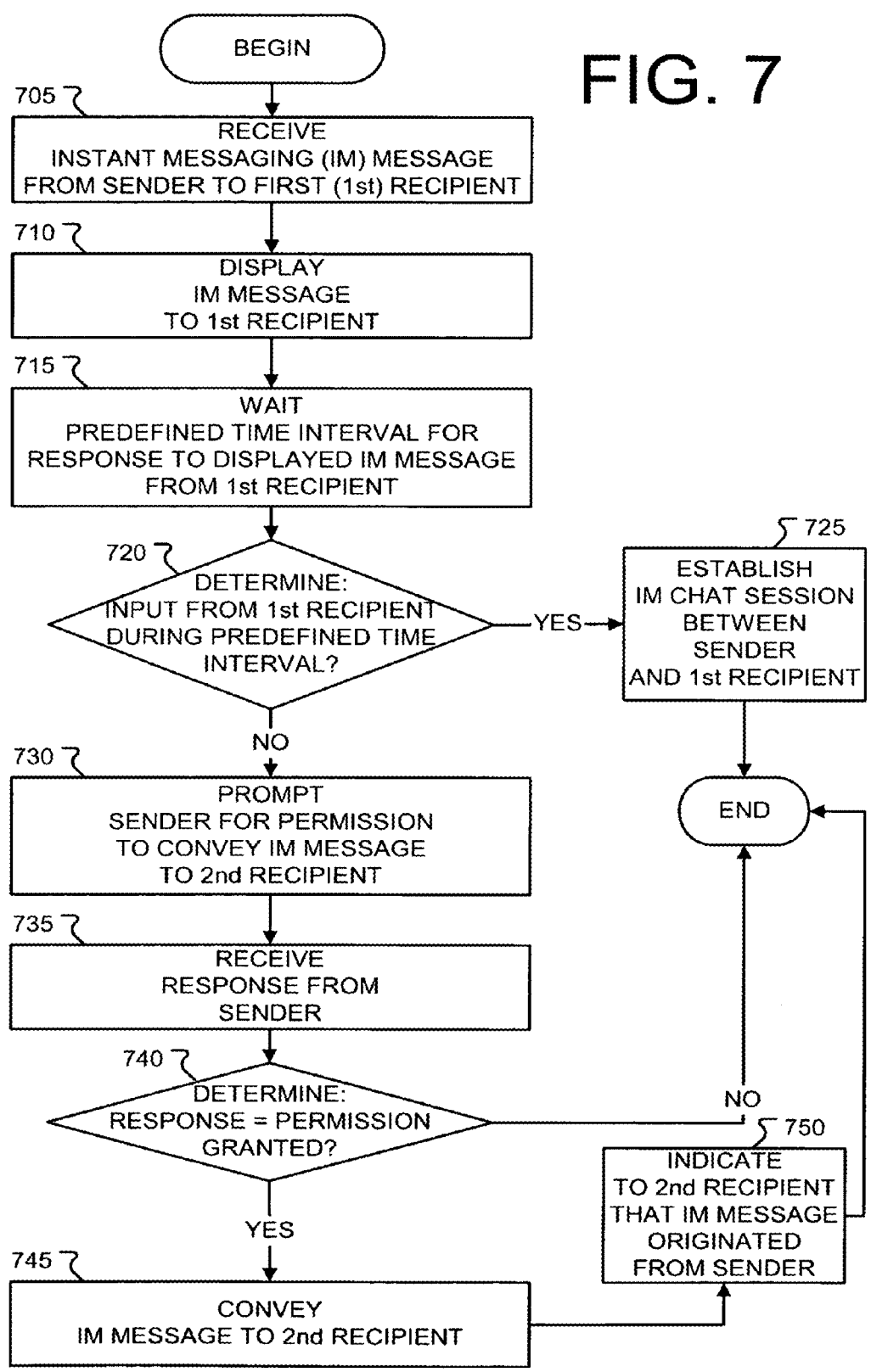
FIG. 7 is a flowchart showing an embodiment of a method for transferring IM messages to a different recipient.

FIG. 7 is a flowchart showing an embodiment of a method for transferring IM messages to a different recipient. In some embodiments, the message-transferring process begins when an IM message from a sender is received (705) by a recipient (also referred to herein as a first recipient). The received IM message is then rendered and displayed (710) to the first recipient. Thereafter, the system waits (715) a predetermined time interval for the first recipient to provide any response to the displayed IM message. Upon expiration of the predetermined time interval, the system determines (720) whether or not there has been any response (or input) from the first recipient. If the first recipient has responded, then an IM chat session is established (725) between the sender of the IM message and the first recipient.

If, on the other hand, no input has been provided by the first recipient, then the system prompts (730) the sender for permission to convey the IM message to a transferee (also referred to herein as a second recipient). When the sender provides a response to the prompt, the system receives (735) the response and determines (740) whether or not the response indicates a granting or denial of permission to transfer the IM message. If the response is a denial of permission to transfer the IM message, then the process terminates. On the other hand, if the response is a granting of permission to transfer the IM message, then the IM message is conveyed (745) to the second recipient. In addition to conveying (745) the IM message, the system may also indicate (750) to the second recipient that the IM message originated from the sender, rather than originating from the first recipient.

In some embodiments, the process of FIG. 7 may be performed by the message-handling IM client 115 as shown in FIGS. 1 through 3B. Hence, for those embodiments, the transferred message may be embedded in an XML stream similar to, for example:

```
14    <message         to="transferee@tdomain.com/
tresource-          from="sender@sdomain.com/
sresource    xml:lang="en">  <body>AUTO-TRANSFER
OF MESSAGE COMPOSED BY SENDER AND
ORIGINALLY DELIVERED TO RECIPIENT</body>
</message>
```

Figure 8:
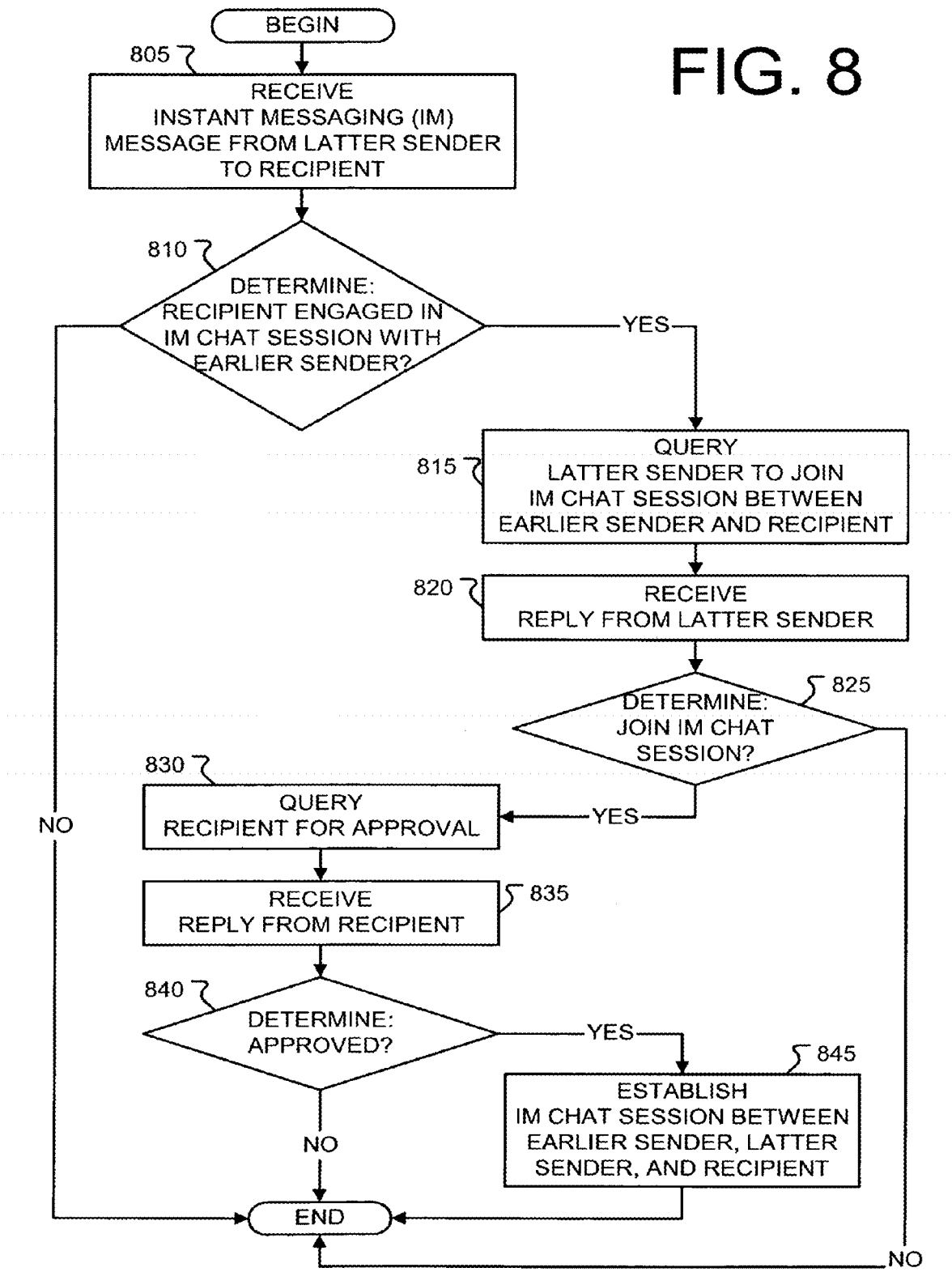
FIG. 8 is a flowchart showing an embodiment of a method for merging IM chat sessions.

FIG. 8 is a flowchart showing an embodiment of a method for merging IM chat sessions. The process of merging IM chat sessions occurs in an environment where a recipient is already engaged in an IM chat session with an earlier sender. Thus, in some embodiments, the process begins when an IM message from a latter sender is received (805) at a message-handling IM client 115 deployed by the recipient. Upon receiving (805) the IM message from the latter sender (hereinafter also referred to as "latter IM message"), the message-handling IM client 115 determines (810) whether or not the recipient is engaged in an IM chat session with an earlier sender. If it is determined (810) that the recipient is not already engaged in an IM chat session, then the process ends.

Conversely, if it is determined (810) that the recipient is already engaged in an IM chat session with an earlier sender, then the message-handling IM client 115 queries (815) the latter sender to determine whether or not the latter sender wishes to join the IM chat session already in progress. In some embodiments, the query may be a pop-up window that is displayed at the latter sender's IM client. In other embodiments, the query may be an automatically generated reply to the latter sender's IM message. In the query, the message-handling IM client 115 asks the latter sender whether or not the latter sender wishes to join the IM chat session between the recipient and the earlier sender, which is already in progress. When the latter sender replies to the query, the message-handling IM client 115 receives (820) the reply and determines (825) whether or not the latter sender has requested to join the IM chat session between the earlier sender and the recipient. If the message-handling IM client 115 determines (825) that the latter sender does not wish to join the IM chat session already in progress, then the process ends.

Alternatively, if the message-handling IM client 115 determines (825) that the latter sender wishes to join the IM chat session already in progress, then the message-handling IM client 115 queries (830) the recipient for approval to include the latter sender in the IM chat session already in progress. In some embodiments, the query may be a pop-up window generated at the recipient's message-handling IM client 115. When the recipient replies to the query, the message-handling IM client 115 receives (835) the query and determines (840) whether or not the recipient has approved the request by the latter sender to join the IM chat session already in progress. If the recipient rejects the request, then the process ends. If, however, the recipient approves the request, then an IM chat session is established (845) between the earlier sender, the latter sender, and the recipient.

Using the example of Romeo and Juliet, the process of FIG. 8 may progress as follows. Initially, an IM chat session is established between Romeo (earlier sender) and Juliet (recipient). During this IM chat session, Mercutio (latter sender) sends an IM message to Juliet. In response to Mercutio's IM message, Juliet's message-handling IM client 115 determines that Juliet is already engaged in an IM chat session with Romeo. Thus, Juliet's message-handling IM client 115 queries Mercutio to determine whether or not Mercutio wishes to join the IM chat session already in progress between Juliet and Romeo. When Mercutio provides an indication that he wishes to join the IM chat session, Juliet's message-handling IM client 115 conveys that indication to Juliet. When Juliet approves of Mercutio's participation in the IM chat session, the IM chat session is opened up to Mercutio. Thus, a three-way IM chat session is established between Romeo, Juliet, and Mercutio.

Figure 9:
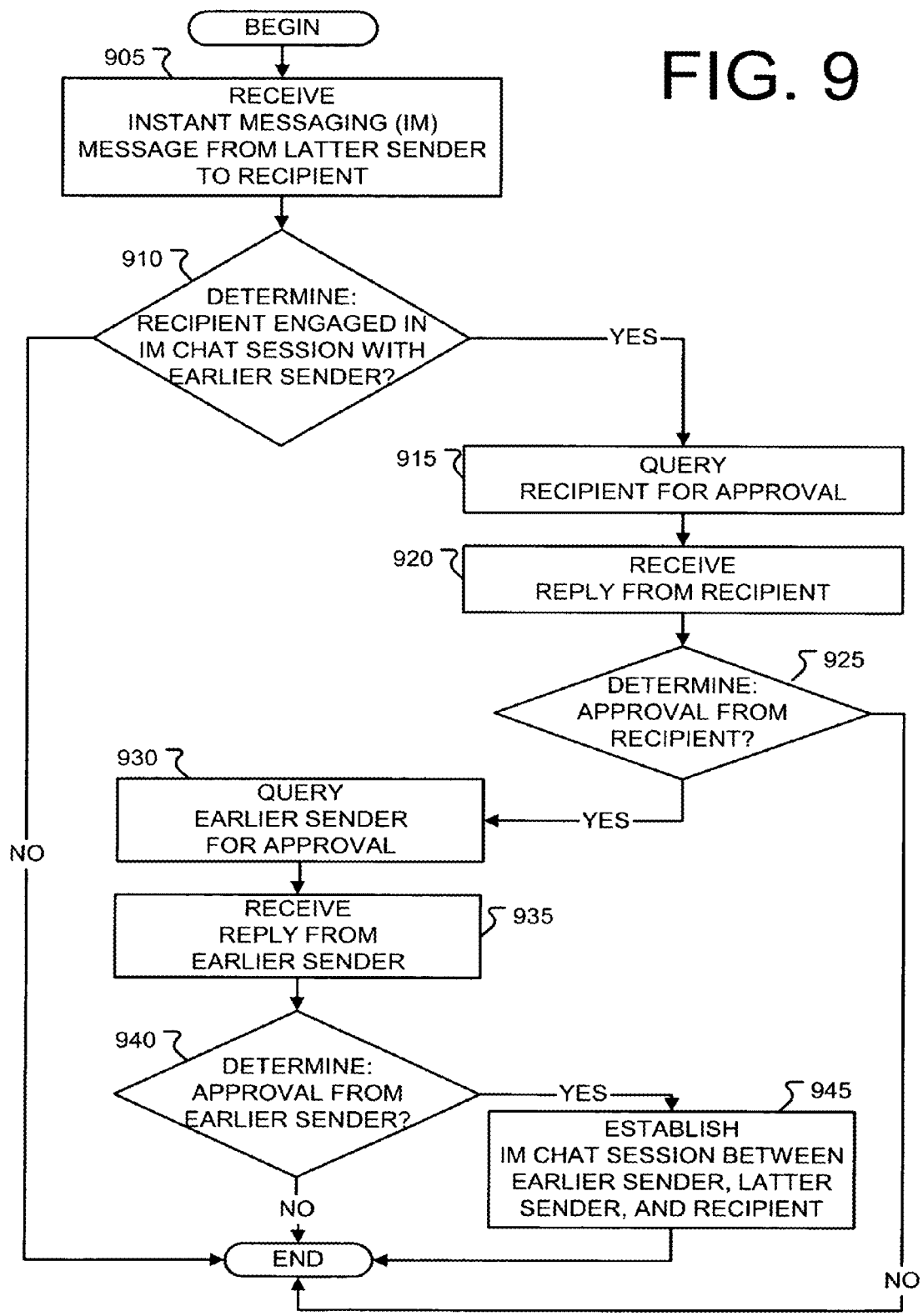
FIG. 9 is a flowchart showing another embodiment of a method for merging IM chat sessions.

FIG. 9 is a flowchart showing another embodiment of a method for merging IM chat sessions. Similar to FIG. 8, the process of merging IM chat sessions in FIG. 9 occurs in an environment where a recipient is already engaged in an IM chat session with an earlier sender. Thus, in some embodiments, the process begins when an IM message from a latter sender is received (905) at a message-handling IM client 115 deployed by the recipient. Upon receiving (905) the latter IM message, the message-handling IM client 115 determines (910) whether or not the recipient is already engaged in an IM chat session with an earlier sender. If it is determined (910) that the recipient is not already engaged in an IM chat session, then the process ends.

If, however, it is determined (910) that the recipient is already engaged in an IM chat session with an earlier sender, then the message-handling IM client 115 queries (915) the recipient for approval to include the latter sender in the IM chat session already in progress. In some embodiments, the query may be a pop-up window that is displayed at the recipient's IM client. In the query, the message-handling IM client 115 asks the recipient whether or not the latter sender may join the IM chat session between the recipient and the earlier sender, which is already in progress. When the recipient replies to the query, the message-handling IM client 115 receives (920) the reply and determines (925) whether or not the recipient has approved the participation of the latter sender in the IM chat session already in progress. If the message-handling IM client 115 determines (925) that the recipient has rejected the participation of the latter sender in the IM chat session already in progress, then the process ends.

Alternatively, if the message-handling IM client 115 determines (925) that the recipient has approved the participation of the latter IM sender in the IM chat session already in progress, then the message-handling IM client 115 also queries (930) the earlier sender for approval to include the latter sender in the IM chat session. In some embodiments, the query may be a pop-up window at the earlier sender's message-handling IM client 115. In other embodiments, the query may be an IM message text line in the IM chat session. Hence, for embodiments employing the IM message text line, the query (915) to the recipient and the query (930) to the earlier sender may occur concurrently. When the earlier sender replies to the query, the message-handling IM client 115 receives (935) the query and determines (940) whether or not the earlier sender has approved the request by the latter sender to join the IM chat session already in progress. If the earlier sender has rejected the request, then the process ends. If, however, the earlier sender has approved the request, then an IM chat session is established (945) between the earlier sender, the latter sender, and the recipient.

Using the example of Romeo and Juliet, the process of FIG. 9 may progress as follows. Initially, an IM chat session is established between Romeo (earlier sender) and Juliet (recipient). During this IM chat session, Mercutio (latter sender) sends an IM message to Juliet. In response to Mercutio's IM message, Juliet's message-handling IM client 115 determines that Juliet is engaged in an IM chat session with Romeo. Thus, Juliet's message-handling IM client 115 queries Juliet to determine whether or not Mercutio is welcome to join the IM chat session already in progress between Juliet and Romeo. When Juliet provides an indication that Mercutio is welcome to join the IM chat session, Juliet's message-handling IM client 115 displays a similar request to Romeo. When Romeo approves of Mercutio's participation in the IM chat session, a three-way IM chat session is established between Romeo, Juliet, and Mercutio.

FIG. 10A is a flowchart showing another embodiment of a method for merging IM chat sessions. Similar to FIGS. 8 and 9, the process of merging IM chat sessions in FIG. 10A occurs in an environment where a recipient is already engaged in an IM chat session with an earlier sender. Thus, in some embodiments, the process begins when an IM message from a latter sender is received (1005) at a message-handling IM client 115 deployed by the recipient. Upon receiving (1005) the latter IM message, the message-handling IM client 115 determines (1010) whether or not the recipient is engaged in an IM chat session with an earlier sender. If it is determined (1010) that the recipient is not already engaged in an IM chat session, then the process ends.

Alternatively, if it is determined (1010) that the recipient is already engaged in an IM chat session with an earlier sender, then the message-handling IM client 115 queries (1015) the recipient for approval to include the latter sender in the IM chat session already in progress. In some embodiments, the query may be a pop-up window that is displayed at the recipient's message-handling IM client. In other embodiments, the query may be an IM message text line that appears in the message window at the recipient's message-handling IM client 115. In the query, the message-handling IM client 115 asks the recipient whether or not the latter sender may join the IM chat session between the recipient and the earlier sender, which is already in progress. When the recipient replies to the query, the message-handling IM client 115 receives (1020) the reply and determines (1025) whether the recipient has approved or rejected the participation of the latter sender in the IM chat session already in progress. If the message-handling IM client 115 determines (1025) that the recipient has rejected the participation of the latter sender in the IM chat session already in progress, then the process ends. If, however, the recipient has approved the latter sender's participation, then a three-way IM chat session is established (1045) between the earlier sender, the latter sender, and the recipient.

Using the example of Romeo and Juliet, the process of FIG. 10A may progress as follows. Initially, an IM chat session is established between Romeo (earlier sender) and Juliet (recipient). During this IM chat session, Mercutio (latter sender) sends an IM message to Juliet. In response to Mercutio's IM message, Juliet's message-handling IM client 115 determines that Juliet is engaged in an IM chat session with Romeo. Thus, Juliet's message-handling IM client 115 queries Juliet to determine whether or not Mercutio is welcome to join the IM chat session already in progress between Juliet and Romeo. When Juliet provides an indication that Mercutio is welcome to join the IM chat session, a three-way IM chat session is established between Romeo, Juliet, and Mercutio.

Figure 10B:
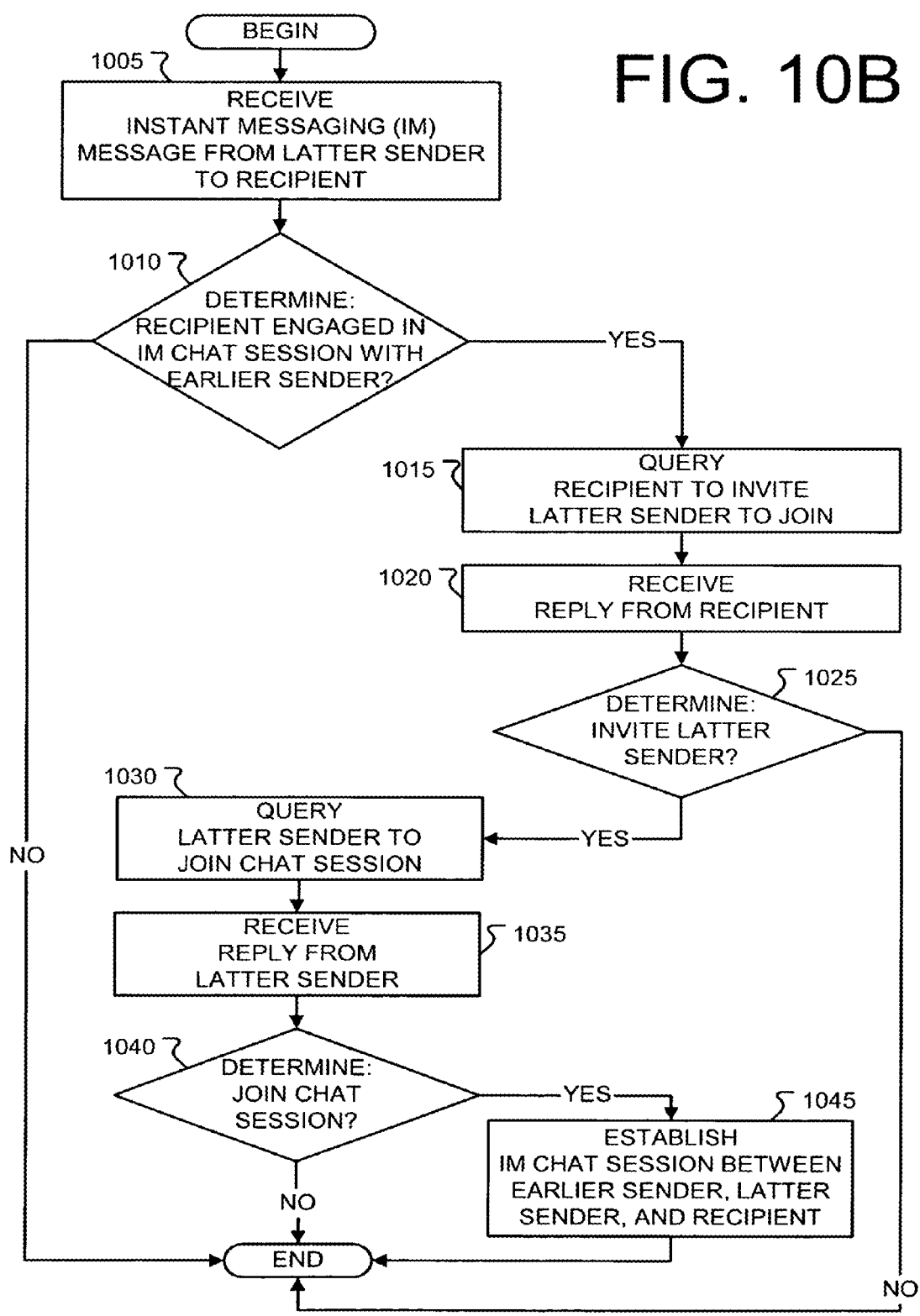
FIG. 10B is a flowchart showing another embodiment of a method for merging IM chat sessions.

FIG. 10B is a flowchart showing another embodiment of a method for merging IM chat sessions. Similar to FIGS. 8 through 10A, the process of merging IM chat sessions in FIG. 10A occurs in an environment where a recipient is already engaged in an IM chat session with an earlier sender. Thus, in some embodiments, the process begins when an IM message from a latter sender is received (1005) at a message-handling IM client 115 deployed by the recipient. Upon receiving (1005) the latter IM message, the message-handling IM client 115 determines (1010) whether or not the recipient is engaged in an IM chat session with an earlier sender. If it is determined (1010) that the recipient is not already engaged in an IM chat session, then the process ends.

Conversely, if it is determined (1010) that the recipient is already engaged in an IM chat session with an earlier sender, then the message-handling IM client 115 queries (1015) the recipient for approval to include the latter sender in the IM chat session already in progress. In some embodiments, the query may be a pop-up window that is displayed at the recipient's IM client. In other embodiments, the query may be an IM message text line that appears in the message window at the recipient's message-handling IM client 115. In the query, the message-handling IM client 115 asks the recipient whether or not the latter sender may participate in the IM chat session between the recipient and the earlier sender, which is already in progress. When the recipient replies to the query, the message-handling IM client 115 receives (1020) the reply and determines (1025) whether or not the recipient has rejected the joining of the latter sender in the IM chat session already in progress. If the message-handling IM client 115 determines (1025) that the recipient has rejected the latter sender's participation, then the process ends. If, however, the recipient has approved the latter sender's participation, then the message-handling IM client 115 queries (1030) the latter sender by issuing an invitation to join the IM chat session already in progress. When the latter sender replies to the query, the message-handling IM client 115 receives (1035) the reply and determines (1040) whether or not the latter sender has accepted the invitation. If the latter sender has rejected the invitation to join the IM chat session already in progress, then the process ends. If, however, the latter sender has accepted the invitation, then a three-way IM chat session is established (1045) between the earlier sender, the latter sender, and the recipient.

Using the example of Romeo and Juliet, the process of FIG. 10B may progress as follows. Initially, an IM chat session is established between Romeo (earlier sender) and Juliet (recipient). During this IM chat session, Mercutio (latter sender) sends an IM message to Juliet. In response to Mercutio's IM message, Juliet's message-handling IM client 115 determines that Juliet is engaged in an IM chat session with Romeo. Thus, Juliet's message-handling IM client 115 queries Juliet to determine whether or not to invite Mercutio to join the IM chat session already in progress between Juliet and Romeo. When Juliet indicates that an invitation should be issued to Mercutio, the message-handling IM client 115 issues an appropriate request to Mercutio and awaits a reply from Mercutio. When Mercutio accepts the invitation, a three-way IM chat session is established between Romeo, Juliet, and Mercutio.

In some embodiments, the processes of FIGS. 8 through 10B may be performed by the message-handling IM client 115 as shown in FIGS. 1 through 3B. As shown in FIGS. 1 through 10B, the disclosed embodiments provide added functionality in handling IM messages, thereby providing for a more versatile IM environment.

Figure 11A:
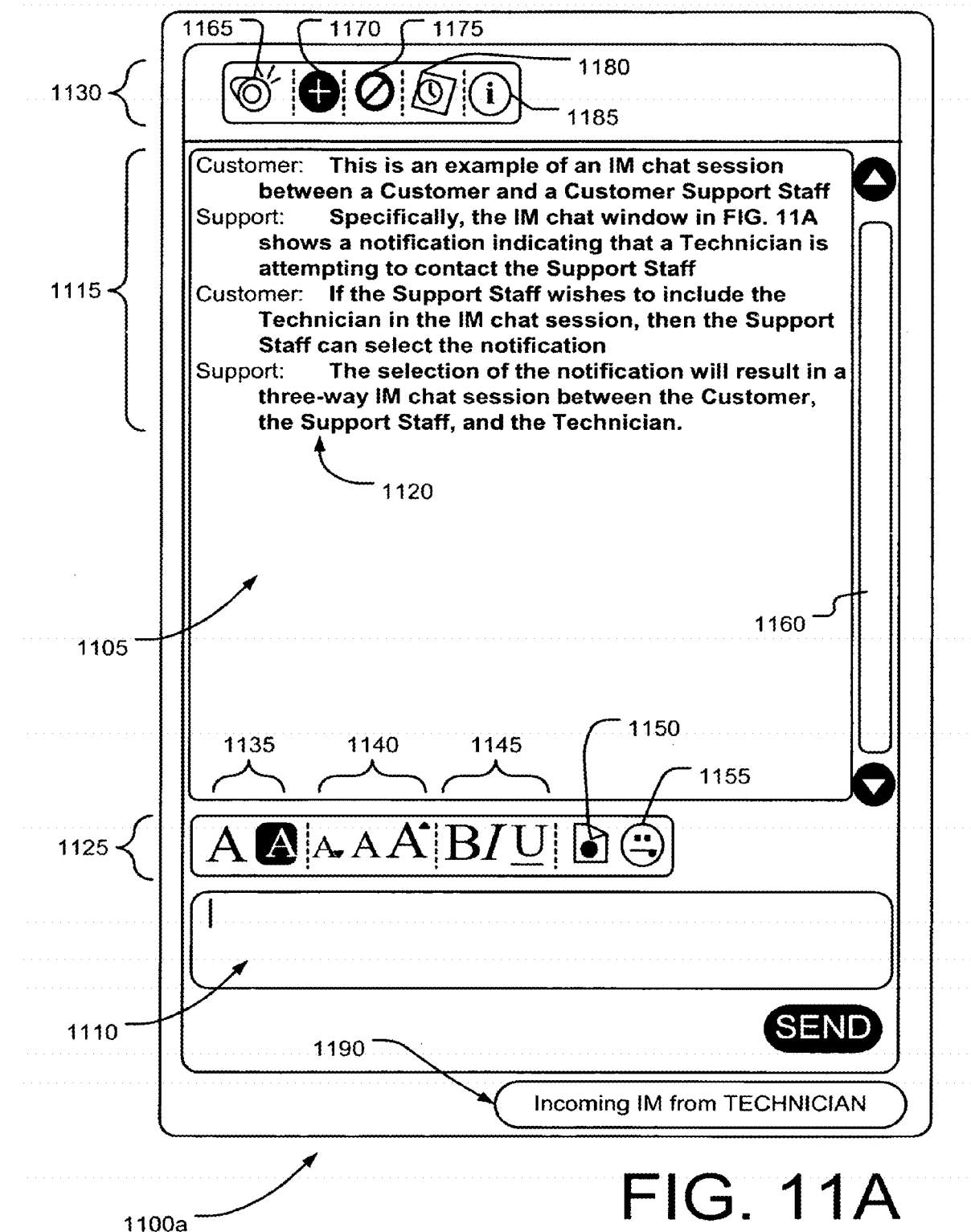
FIG. 11A is a diagram showing an embodiment of a user interface associated with the merging of IM chat sessions.
Figure 11B:
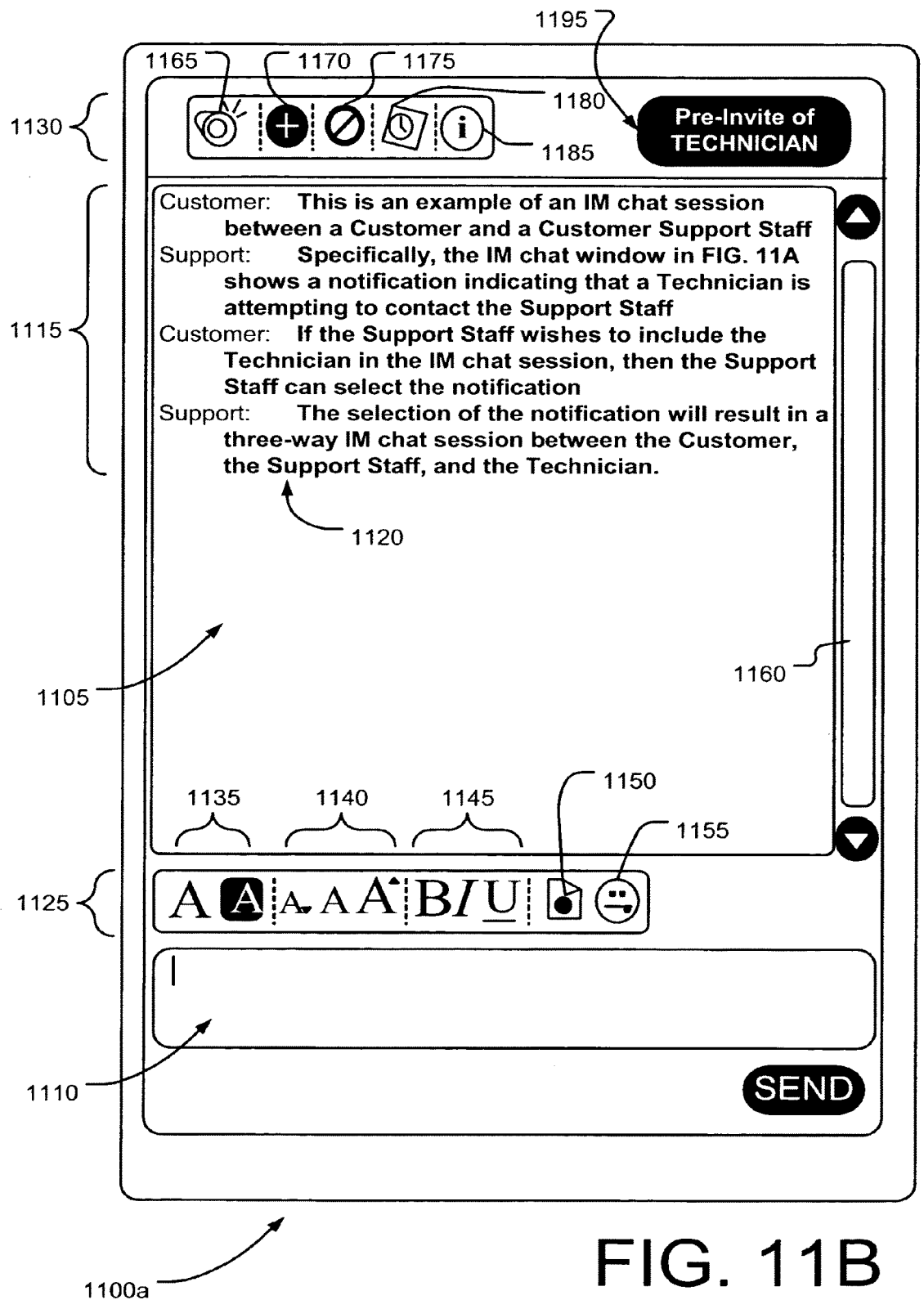
FIG. 11B is a diagram showing another embodiment of a user interface associated with the merging of IM chat sessions.

Having described systems and methods for increasing functionality in IM communications, attention is turned to FIGS. 11A and 11B, which provide a user interface that implements additional IM functionality.

FIG. 11A is a diagram showing an embodiment of a user interface for an IM chat session. Specifically, FIG. 11A shows an IM chat session between a customer and a customer support staff member (hereinafter "support staff"). As shown in FIG. 11A, during text IM, the support staff types a text message in an input area 1110 to a customer. Thereafter, the customer may reply to the support staff's text message. This back-and-forth exchange of text messages is often displayed in a dialogue box 1105 at an IM chat window 1100*a*, with the most-recently-displayed message 1120 typically being displayed at the bottom of the IM messages 1115. Hence, both the support staff and the customer may follow the history of the conversation by viewing the IM messages 1115 displayed in the dialogue box 1105. As is known, the IM chat window 1100*a* may include a scroll bar 1160 that permits the support staff to scroll portions of the IM messages 1115 that may have moved beyond the visible area of the dialogue box 1105, as the support staff and the customer exchange IM messages 1115.

As is known to those of skill in the art, the IM chat window 1100*a* may also include various function bars 1130, 1125 that include icons, such as, color selection icons 1135 that permit the support staff to change the foreground and background color of the dialogue box 1105, font size manipulation icons 1140 that permit the support staff to change the font size of the text, font type manipulation icons 1145 that permit the support staff to change the font size, a uniform resource locator (URL) icon 1150 that permits the support staff to send URL information, an emoticon icon 1155 that permits the support staff to display a variety of emoticons (e.g., smiley faces, sad faces, etc.), a speaker icon 1165 that permits the support staff to turn on or off incoming audio streams, an add-customer icon 1170 that permits the support staff to add the customer to the support staff's IM customer list, a block icon 1175 that permits the support staff to block or ignore the IM customer, an IM history icon 1180 that permits the support staff to begin or end logging the IM chat session, a customer information icon 1185 that permits the support staff to obtain additional information about the customer, and other icons that perform a variety of other IM functions.

Specifically, FIG. 11A shows an embodiment having an icon 1190 that indicates to the support staff that a technical support member (hereinafter "technician") is attempting to send an IM to the support staff while the support staff is engaged in an IM chat session with a customer. For example, an embodiment of the process begins with a customer and a support staff engaged in an IM chat session. As the customer and the support staff are exchanging IM chat messages 1115 within the IM dialogue box 1105, a technician types an IM message to the support staff. As the technician is typing the IM message to the support staff, an icon 1190 appears in the IM chat window of the support staff. The icon 1190 indicates to the support staff that the technician is currently typing an IM chat message to the support staff. Alternatively, the icon 1190 indicates that the technician has sent an IM message to the support staff. In some embodiments, the icon 1190 also acts as an alert that prompts the support staff to determine whether or not the support staff wishes to include the technician as a participant in the IM chat session between the customer and the support staff. In some embodiments, when the support staff selects the icon 1190, the message-handling IM client 1100 reconfigures the IM chat session from a two-way IM chat session between the customer and the support staff to a three-way IM chat session between the customer, the support staff, and the technician. In other words, when the technician attempts to send an IM to the support staff, and the support staff indicates that the technician should be a participant in the currently-established IM chat session, the message-handling IM client 1100 converts the two-way IM chat session to a three-way IM chat session.

In some embodiments, if the support staff ignores the alert, then the technician is not included in the two-way IM chat session between the customer and the support staff. Alternatively, the IM client may provide a mechanism by which the support staff may explicitly reject the incoming IM message from the technician. Also, in some embodiments, the IM client may provide a mechanism by which the support staff may identify that the IM chat session with the technician should be a separate IM chat session than the IM chat session with the customer.

In other embodiments, such as that shown in FIG. 11B, the IM chat window 1100 may include another icon 1195 (also referred to herein as "pre-invite icon" 1195) that configures the message-handling IM client 1100 to poll for the presence of the technician. That pre-invite icon 1195 may be customized by the support staff to initiate polling for the presence of any individual that the support staff wishes to include in the IM chat session. For those embodiments, where the message-handling IM client 1100 has pre-invited the technician, when the status of the technician becomes present online, the message-handling IM client 1100 of the support staff issues an invitation to the pre-invited technician to join the IM chat session already in progress. Since mechanisms for inviting others to join IM chat sessions is known in the art, further discussion of invitations to join IM chat sessions is omitted here.

The pre-invite feature is particularly useful in business environments where a support staff is attempting to answer a customer's questions, but needs the additional assistance of a technician to properly answer the questions. For example, if a customer is engaged in an IM chat session with a support staff because of technical problems experienced by the customer for a particular computer-related product, then the pre-invite of a technician will allow the support staff to solicit participation of a technician in the solving of the technical problem when the technician becomes available. In this regard, when a technician becomes available (or present), an invitation is issued to the technician to join the IM chat session already in progress. Thus, rather than having the customer's questions relayed to the technician by the support staff through another IM chat session, the technician may directly engage the customer and the support staff to solve the technical problem.

In some embodiments, when the three-way IM chat session is established, the entire transcript of the IM chat session will be available to the technician so that the technician may be apprised of the dialogue between the customer and the support staff prior to the technician's joining the IM chat session.

As shown in FIGS. 11A and 11B, greater functionality in IM communications is achieved by providing capabilities to merge IM chat sessions.

The message-handling IM client 115*a* . . . 115*c*, the IM receive logic 305, 307, the display logic 310, 312, the timing logic 315, the prompting logic 320, the presence logic 325, the convey logic 330, the message-reply logic 340, the message-transfer logic 345, the message-forward logic 350, the IM address append logic 355, the indicator messages 360, the IM addresses 335, session-tracker logic 317, sender-query logic 322, recipient-query logic 332, merge-determination logic 327, IM chat-session-merge logic 337, chat-room logic 342, and other logic components for carrying out the recited functions in the present invention can be implemented in hardware, software, firmware, or a combination thereof. In the preferred embodiment(s), the message-handling IM client 115a . . . 115c, the IM receive logic 305, 307, the display logic 310, 312, the timing logic 315, the prompting logic 320, the presence logic 325, the convey logic 330, the message-reply logic 340, the message-transfer logic 345, the message-forward logic 350, the IM address append logic 355, the indicator messages 360, the IM addresses 335, session-tracker logic 317, sender-query logic 322, recipient-query logic 332, merge-determination logic 327, IM chat-session-merge logic 337, chat-room logic 342, and other logic components for carrying out the recited functions are implemented in software or firmware that is stored in a memory and that is executed by a suitable instruction execution system. If implemented in hardware, as in an alternative embodiment, the message-handling IM client 115a . . . 115c, the IM receive logic 305, 307, the display logic 310, 312, the timing logic 315, the prompting logic 320, the presence logic 325, the convey logic 330, the message-reply logic 340, the message-transfer logic 345, the message-forward logic 350, the IM address append logic 355, the indicator messages 360, the IM addresses 335, session-tracker logic 317, sender-query logic 322, recipient-query logic 332, merge-determination logic 327, IM chat-session-merge logic 337, chat-room logic 342, and other logic components for carrying out the recited functions can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The message-handling IM client 115a . . . 115c may be implemented as a computer program, which comprises an ordered listing of executable instructions for implementing logical functions. As such, the message handling IM client 115a . . . 115c may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored Although exemplary embodiments have been shown and described, it will be clear to those of ordinary skill in the art that a number of changes, modifications, or alterations may be made, none of which depart from the spirit of the present invention. For example, while the disclosed embodiments show the system as being implemented in a single IM-capable device such as, for example, a workstation, a PDA, or a cellular telephone, it should be appreciated that the system may be implemented at the server-side, in which the auto-reply, auto-forward, and/or auto-message-transfer functions are performed by a server rather than by a client. Also, it should be appreciated that the above-described functions may be implemented in a distributed network, where a server and a client, in combination, perform the above-recited functions. Moreover, while the embodiments are described in the context of XML, it should be appreciated that other IM protocols may be used to implement the auto-reply, auto-forward, and/or auto-message-transfer functions. While automatic handling of IM messages have been described, it should be appreciated that the auto-handling may be initiated by the recipient, rather than being initiated by an elapsed time. Hence, while fully automated message handling approaches are described herein, it should be appreciated that other embodiments may include manual intervention as a part of a semi-automated process. Also, while embodiments are shown in which IM chat sessions between a recipient and an earlier sender is merged with an IM chat session between the recipient and a latter sender, it should be appreciated that, for some embodiments, multiple IM chat sessions that are already established may be merged. In this regard, rather than waiting for an incoming IM message, a recipient may merge IM chat sessions that are already in progress between multiple senders. All such changes, modifications, and alterations should therefore be seen as within the scope of the present invention.

What is claimed is:

1. A system, comprising:
 a memory that stores instructions;
 a processor that executes the instructions to perform operations, the operations comprising:
  determining if a response from a recipient was sent to a sender during a first time interval, wherein the response is a reply to an instant messaging message sent by the sender to the recipient;
  determining if the recipient is already engaged in a first instant messaging chat session with a contact if the response from the recipient is determined to not be sent to the sender during the first time interval; and
  providing, if the recipient is determined to be already engaged in the first instant messaging chat session with the contact, a first message to the sender that notifies the sender to wait for a second time interval for the response from the recipient.

2. The system of claim 1, wherein the operations further comprise receiving the instant messaging message from the sender to the recipient.

3. The system of claim 1, wherein the operations further comprise waiting for the response from the recipient for the first time interval.

4. The system of claim 1, wherein the operations further comprise establishing a second instant messaging chat session between the sender and the recipient if the recipient sends the response during the second time interval.

5. The system of claim 1, wherein the operations further comprise displaying the instant messaging message.

6. The system of claim 1, wherein the operations further comprise providing a second message to the sender that indicates that the recipient is unavailable of the response from the recipient is determined to not be sent to the sender during the first time interval and if the recipient is determined to not be already engaged in the first instant messaging chat session with the contact.

7. The system of claim 1, wherein the operations further comprise selecting an instant messaging address of a plurality of instant messaging addresses of the recipient.

8. The system of claim 7, wherein the operations further comprise determining if the recipient is present at the instant messaging address that is selected.

9. The system of claim 8, further comprising determining a last active time for the instant messaging address selected if the recipient is present at the instant messaging address selected.

10. The system of claim 9, wherein the operations further comprise determining whether the instant messaging address selected has a most recent last active time.

11. The system of claim 10, wherein the operations further comprise storing the instant messaging address selected as a target instant messaging address if the instant messaging address selected is determined to have the most recent last active time.

12. A method, comprising:
determining, by utilizing instructions from memory that are executed by a processor, if a response from a recipient was sent to a sender during a first time interval, wherein the response is a reply to an instant messaging message sent by the sender to the recipient;
determining if the recipient is already engaged in a first instant messaging chat session with a contact if the response from the recipient is determined to not be sent to the sender during the first time interval; and
providing, if the recipient is determined to be already engaged in the first instant messaging chat session with the contact, a first message to the sender that notifies the sender to wait for a second time interval for the response from the recipient.

13. The method of claim 12, further comprising establishing a second instant messaging chat session between the sender and the recipient if the recipient sends the response during the second time interval.

14. The method of claim 12, further comprising providing a second message to the sender that indicates that the recipient is unavailable of the response from the recipient is determined to not be sent to the sender during the first time interval and if the recipient is determined to not be already engaged in the first instant messaging chat session with the contact.

15. The method of claim 12, further comprising prompting the sender for permission to transmit the instant messaging message to a different recipient if the response from the recipient is determined to not be sent to the sender during the first time interval.

16. The method of claim 12, further comprising selecting an instant messaging address of a plurality of instant messaging addresses of the recipient.

17. The method of claim 16, further comprising determining if the recipient is present at the instant messaging address that is selected.

18. The method of claim 17, further comprising determining a last active time for the instant messaging address selected if the recipient is present at the instant messaging address selected.

19. The method of claim 18, further comprising determining whether the instant messaging address selected has a most recent last active time, and further comprising storing the instant messaging address selected as a target instant messaging address if the instant messaging address selected is determined to have the most recent last active time.

20. A non-transitory computer-readable device comprising instructions, which, when loaded and executed by a processor, cause the processor to perform operations, the operations comprising:
determining if a response from a recipient was sent to a sender during a first time interval, wherein the response is a reply to an instant messaging message sent by the sender to the recipient;
determining if the recipient is already engaged in a first instant messaging chat session with a contact if the response from the recipient is determined to not be sent to the sender during the first time interval; and
providing, if the recipient is determined to be already engaged in the first instant messaging chat session with the contact, a first message to the sender that notifies the sender to wait for a second time interval for the response from the recipient.

* * * * *